United States Patent [19]
Kishi et al.

[11] Patent Number: 4,490,781
[45] Date of Patent: Dec. 25, 1984

[54] SYSTEM AND METHOD FOR PREPARING NUMERICAL CONTROL INFORMATION

[75] Inventors: Hajimu Kishi, Hino; Masaki Seki, Takaidonishi; Kunio Tanaka; Takashi Takegahara, both of Hachioji, all of Japan

[73] Assignee: Fujitsu Fanuc Limited, Tokyo, Japan

[21] Appl. No.: 279,600

[22] Filed: Jul. 1, 1981

[30] Foreign Application Priority Data

Jul. 10, 1980 [JP] Japan ................ 55-94173

[51] Int. Cl.³ .................. G06F 3/04; G06F 15/46; G05B 19/18
[52] U.S. Cl. .................. 364/191; 364/147; 364/171; 364/521
[58] Field of Search .......... 364/136, 147, 171, 191, 364/192, 200, 900

[56] References Cited

U.S. PATENT DOCUMENTS

| | | | |
|---|---|---|---|
| 3,634,662 | 1/1972 | Slawson | 364/192 |
| 4,010,356 | 3/1977 | Evans et al. | 364/900 |
| 4,144,582 | 3/1979 | Hyatt | 364/900 |
| 4,150,427 | 4/1979 | Slawson | 364/192 |
| 4,314,330 | 2/1982 | Slawson | 364/191 |

FOREIGN PATENT DOCUMENTS

1574606  6/1971  Fed. Rep. of Germany .

OTHER PUBLICATIONS

Adamczyk et al: Systeme zur Numerischen Steuerung von Funkenerodiermaschinen, VDI Zeitschrift, vol. 119, No. 6, Mar. 1977, pp. 4-7.
Beran: Numerical Control Programming via Computer Graphics, Proceedings of the 16th Annual Meeting and Technical Conference of the Numerical Control Society, Mar. 1979, pp. 56-71.
Ketley: A Tape Generator for N/C Turning, Step 7, 15th Numerical Control Society Annual Meeting and Conference, Apr. 1978.

*Primary Examiner*—Felix D. Gruber
*Attorney, Agent, or Firm*—Staas & Halsey

[57] ABSTRACT

A system for preparing numerical control information wherein data necessary for machining is divided into several items and then entered, item-by-item, in accordance with certain rules, in an apparatus for preparing numerical control information. The apparatus responds by executing predetermined arithmetic and editing operations to prepare the numerical control information. To input the data, language and graphics readily understandable by one who can prepare or comprehend an ordinary blueprint are displayed on a display screen provided on the apparatus, the display using ordinary characters and symbols to request that the operator enter the required data. The operator responds to the request by using ordinary numerals, characters and symbols to enter the required data in the apparatus for preparing the numerical control information.

38 Claims, 31 Drawing Figures

FIG. 9

\* Part Shape \*

| Code No. | Shape Segments |
|---|---|
| 001 : | →↑→C↓R→↓← |
| 002 : | →↓→R↓→R→↓← |
| 003 : | →↓→↑→↑→↑→C↓ |
| 004 : | →∩\→∩ |
| 005 : | |
| 006 : | ---------- |

| 001 | = | →↑→C↓R→↓← |
|---|---|---|
| Shape | = | 001 |

FIG. 10

| Symbol | ← | ↖ | ↑ | ↗ | → | ↘ | ↓ | ↙ | ◯ | ◯ | C | R |
|---|---|---|---|---|---|---|---|---|---|---|---|---|
| No. | 1 | 2 | 3 | 4 | 5 | 6 | 7 | 8 | 9 | 0 | C | R |

FIG. 11

| Code No. | Shape Code | Shape Code (in terms of Shape symbols) | Typical Port Shapes |
|---|---|---|---|
| 0 0 1 | 575C7 | →↓→C↓ | |
| 0 0 2 | 575R7R5717 | →↓→R↓R→↓→↓ | |
| 0 0 3 | 57575357535C7 | →↓→↓→↓→↓→↓→C↓ | |
| 0 0 4 | 50659 | →◯↖→◯ | |
| 0 0 5 | Blank | Blank | Blank |
| ⋮ | ⋮ | ⋮ | ⋮ |
| 9 9 9 | Blank | Blank | Blank |

FIG. 12

\* Part Shape \*

| Code No. | Shape Segments | Shape Code |
|---|---|---|
| 001 : | ↑→↓→C↓ | 626C2 |
| 002 : | ↑→↑→R↓→R→↑→↓→↑ | 626R26R6242 |
| 003 : | ↑→↑→↑→↑→↑→↑→↑→C↓ | 62628626686C2 |
| 004 : | ↑→∩→∩ | 6·360 |
| 005 : | | |
| 006 : | -------- | -------- |

= [　　　]

= [Code]

FIG. 13

| Code No. | Shape Code (I) | Shape Code (II) | Shape |
|---|---|---|---|
| 0 0 1 | 5 7 5 7 | →\|→\| | ⌐_⌐_ |
| 0 0 2 | 5 0 5 C 7 | →\|→C\| | ⌒⌐_ |
| 0 0 3 | 5 7 5 7 5 0 5 C 7 | →\|→\|→\|→C\| | ⌐⌐⌒⌐_ |

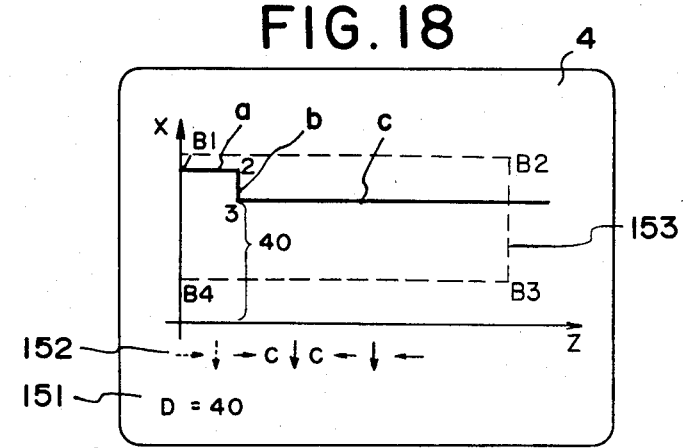
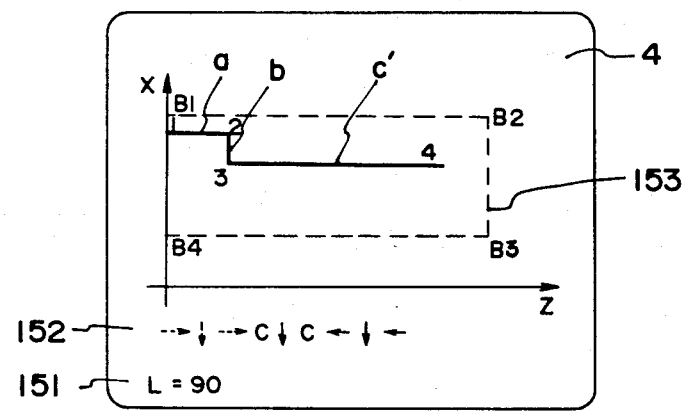
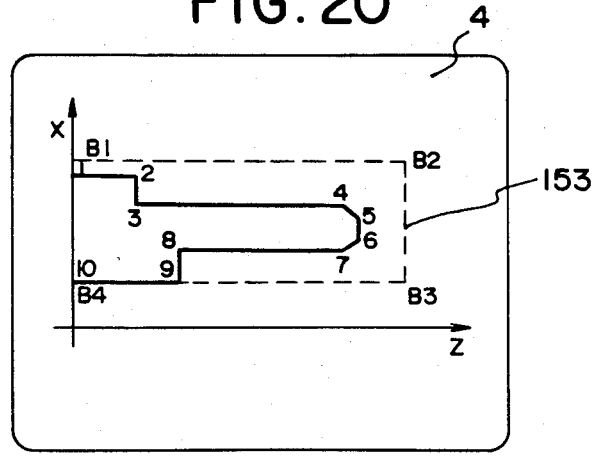

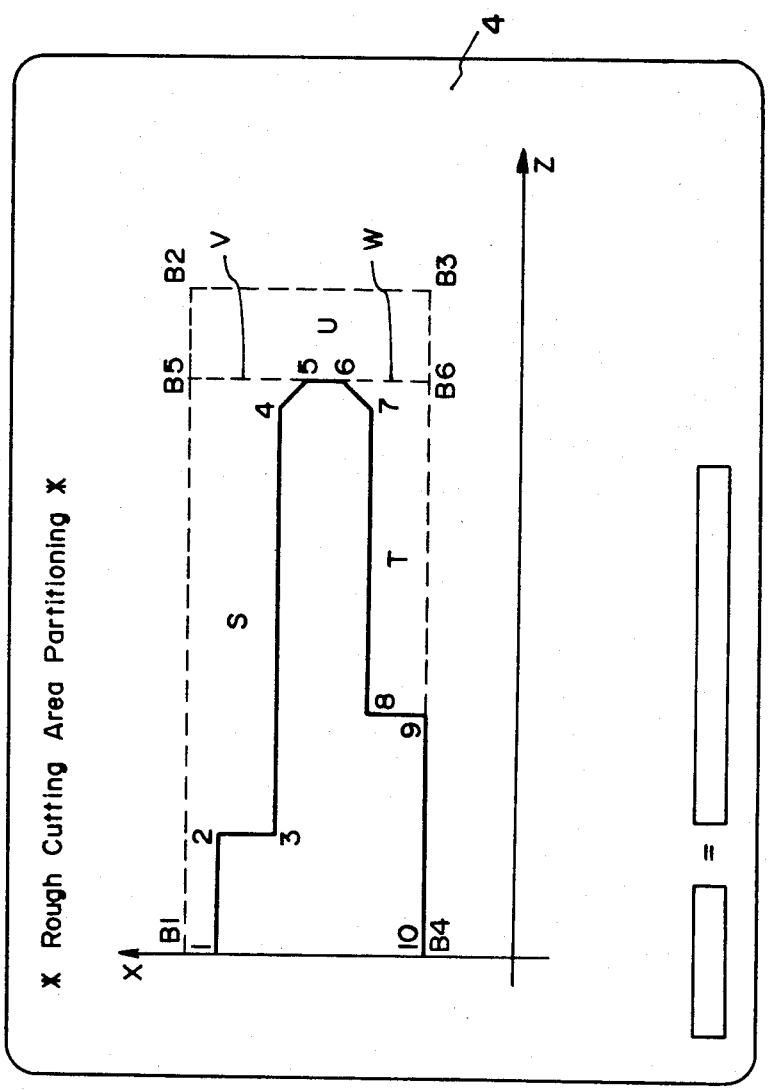

FIG. 24

```
* Machining Type *

NO.    Machining Type

1  :  Drilling
 2  :  Outer Diameter Cutting
 3  :  Inner Diameter Cutting
 4  :  Outer Diameter Grooving
 5  :  Inner Diameter Grooving
 6  :  Outer Diameter Threading
 7  :  Inner Diameter Threading

0  :  END

Designate type of Tool to be used

```
* Machining Tape *

NO.   Machining Content
 1  :  Center Boring , Center Drilling
 2  :  End Face Rough Machining
 3  :  Outer Diameter Rough Machining
 4  :  Inner      "         "
 5  :  End Face Finishing
 6  :  Outer Diameter Finishing
 7  :  Inner      "         "
 8  :  Groove cutting
 9  :  Thread     "
 0  :  END Designate content of machining tape by number
NO  =  [    ]
       26.1
```

SYSTEM AND METHOD FOR PREPARING NUMERICAL CONTROL INFORMATION

BACKGROUND OF THE INVENTION

This invention relates to a system for preparing numerical control information, particularly a system that permits numerical control information to be prepared without requiring that an operator possesses a high level of skill.

In numerically controlled machining it is required that a variety of numerical control (hereinafter NC) information be entered in a numerical control device so that a machine tool employing the NC device may machine a workpiece drawn out on a blueprint. An increase in the productivity of a numerically controlled machine tool could be expected if it were possible for an ordinary individual to enter the NC information quickly and accurately in a simple manner. Ordinarily the NC information for the control of a machine tool is stored by punching it in a paper NC tape or by writing it in a portable bubble cassette memory. The numerical control device, while reading the NC information several blocks at a time from the NC tape or from the portable bubble cassette memory, processes the information and sends commands to the NC machine tool which responds by performing the prescribed machining operation.

The NC information stored on the NC tape or in the portable bubble cassette memory is prepared by manual calculation or by using a computer. The manual calculation method used, for example, in the numerical control of a contour, proceeds in the following manner for a simple two-dimensional figure. First, the diagram on the blueprint is divided into blocks of line segments and arcs, and information relating to each of the blocks is assembled line-by-line in the form of a list or table, thereby creating a process sheet. Information is prepared in accordance with the process sheet and is then stored sequentially on the NC tape or in the portable bubble cassette memory. In accordance with the computer method, input language for automatic programming is used to prepare a part program for each workpiece, an appropriate medium is used to input the part program in an apparatus that prepares numerical control information through use of a computer, the apparatus prepares the numerical control information automatically on the basis of the input data, and the numerical control information is stored on an NC tape or in the portable bubble cassette memory. Both of these methods for preparing NC information are disadvantageous because an individual not accustomed to such practice would have to remember how to prepare process sheets or would have to memorize the input language for automatic programming. An individual not having received such training would find it almost impossible to prepare the NC information. Furthermore, even an individual skilled in NC information preparation finds the task a troublesome one when adopting the conventional methods described above. Hence there is great demand for a system that would enable an NC machining procedure to be input and processed quickly, simply and accurately by an operator of ordinary skill. Until now a novel system of this type has not been realized in the art.

SUMMARY OF THE INVENTION

Accordingly, an object of the present invention is to provide a novel system that enables even an inexperienced operator to prepare numerical control information quickly, simply and accurately.

Another object of the present invention is to provide a system that enables numerical control information to be prepared in a simple manner without the use of special language.

Other features and advantages of the invention will be apparent from the following description taken in conjunction with the accompanying drawings.

BRIEF DESCRIPTION OF THE DRAWINGS

FIGS. 8 and 9 are other displays displayed on a display screen during the input of data relating to part shape;

FIG. 10 is a table showing a comparison between shape symbols and numbers corresponding thereto;

FIG. 11 is a table showing shape codes stored in a memory located within the apparatus for preparing numerical control information;

FIG. 12 is still another display which appears on a display screen during the input of data relating to part shape;

FIG. 13 is a table which is useful in describing the manner in which registered graphics are added together to form new registered graphics;

FIGS. 15 through 20 are displays useful in describing the input of data relating to the dimensions of a part;

FIG. 21 is a display which appears on a display screen during the input of data relating to machining areas;

FIG. 24 is a display which appears on a display screen during the input of data relating to tool type selection;

FIG. 26 is a display which appears on a display screen during the input of data relating to a machining schedule;

DESCRIPTION OF THE PREFERRED EMBODIMENT

Figure 1:
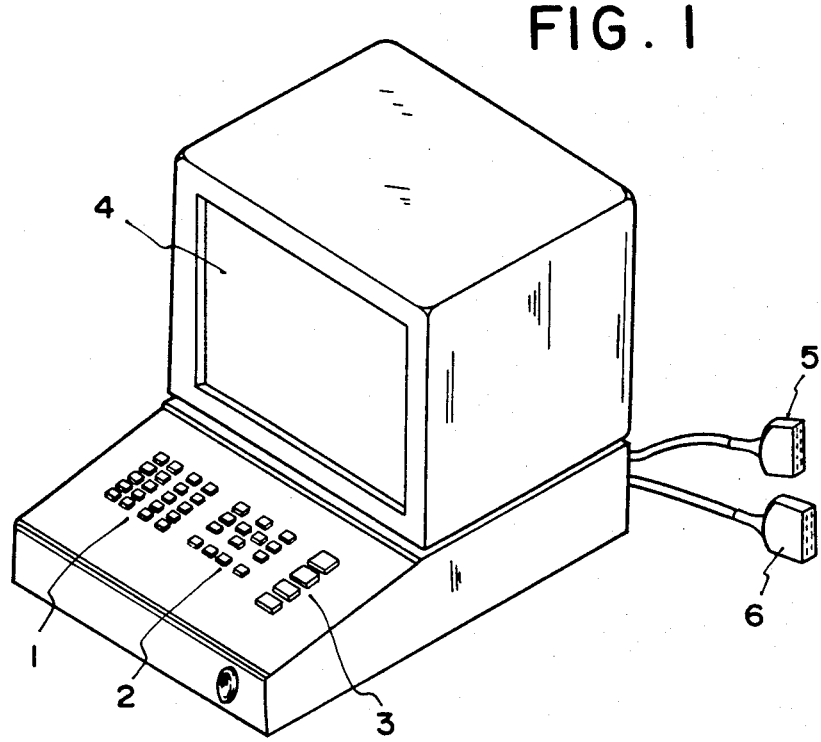
FIG. 1 is a perspective view a numerical control information preparing apparatus for practicing the present invention.

When preparing numerical control information by the system of the present invention, data required for a machining operation is divided into main items shown below, the machining data is entered, item-by-item, in a numerical information preparing apparatus in accordance with certain rules, and predetermined arithmetic and editing operations are executed within said apparatus on the basis of the input data, thereby to prepare numerical control information.

Main Items (1) Selection of coordinate system

This data indicates in which of four quadrants a workpiece is placed for projection. In other words, the data indicates whether the drawing on a blueprint is expressed in terms of a first, second, third or fourth angle projection. The data giving such indication is applied as an input to the NC information preparing apparatus which will be described later.

(2) Input of figures

The contour of the finished workpiece or part as represented on the blueprint is specified through the use of graphic symbols or the like. The resulting data is then applied as an input.

(3) Input of shape and dimensions of stock material

Data is obtained to give an indication of the shape and dimensions of the principal portions of the starting stock which is to be machined. This data also is applied as an input.

(4) Input of part dimensions

Data is obtained to give an indication of the final dimensions of each portion of the finished workpiece. This data is applied as an input.

(5) Designation of rough machining areas

When cutting a workpiece from the starting stock by cutting work, rough cutting down to a certain region measured from the stock surface is carried out in order, say, to shorten machining time. Data indicative of the rough-cut region is obtained and applied as an input. If the rough-cut regions extend over several regions because of the shape of the starting stock, the shape intended for the workpiece and the shape of the cutting tool, then data indicative of each of these regions is obtained and applied as an input.

(6) Designation of machining starting point

It is necessary at the start of machining to determine the position of the machining starting point in order to indicate where the cutting tool is initially located. Therefore the position of the machining starting point is set in advance, and the data indicative thereof is applied as an input.

(7) Selection of appropriate tools

When a single machine tool is equipped with a plurality of tools, as in the case of a turret lathe or machining center, various tools are selected by the machining portion of the machine tool, and those tools best suited for the various locations on the workpiece must be employed. Data indicating what tools are to be used and in what order is, therefore, extremely important in the machining process. This data is obtained and applied as an input.

(8) Designation of appropriate tool information

A wide variety of tool information exists in connection with tools used for cutting work. For example, such information includes the shape and dimensions peculiar to each tool and, when tools are mounted on a pedestal or holder, the distance from the center of the mounting arrangement to the cutting end of each tool. True machining information cannot be obtained unless the information of the type described is given for each and every tool that is to be employed. The pertinent data must therefore be acquired and applied as an input.

(9) Designation of machining schedule

In order to cut a single part from the starting stock and work the part into a finished item, a variety of machining operations must be applied, such as rough cutting applied to surfaces and to internal portions, boring, surface finishing and threading. It is therefore necessary to acquire, for every portion of the article, information indicative of the kind of machining to be applied and where it is to be applied. The pertinent data is applied as an input.

(10) Processing of machining schedule

Once the machining schedule has been designated, the information necessary for processing the schedule is provided, and the paths over which tools are to move are computed from such information.

The method of supplying the above data to the apparatus for preparing the NC information makes no use whatsoever of a special programming language, unlike the method employed in the prior art. Instead, the present apparatus presents a visual display of terminology and graphic representations which may be readily comprehended by one having ordinary skill in blueprint reading or preparation, and assists the operator in inputting the necessary data by displaying commonly employed characters and symbols on a display screen. An operator using such characters and symbols enters the necessary data into the apparatus for preparing numerical control (NC) information. The apparatus will be referred to as "the present apparatus" hereinafter. Inquiries and the operator's responses to the inquiries take place for each of the main items mentioned above and in accordance with a predetermined sequence within each main item. The operator, merely by pressing a key for advancing processing upon the completion of a single information input, is able to advance each processing step in accordance with the predetermined sequence without error.

The present apparatus, following entry of the total data relating to part machining, uses the data to prepare NC information necessary for the fabrication of the part specified by the blueprint. When an arrangement is adopted in which the results of tool path computations are fed to an interpolator, the present invention serves as a numerical control information preparation system in a numerical control device. When the results of the tool path computations are punched in a paper tape using an NC tape format, or when they are stored in a tape bubble cassette, the present invention serves as a numerical control information preparation system in a device for automatic NC tape preparation, or in a device for automatic NC programming.

Figure 2:
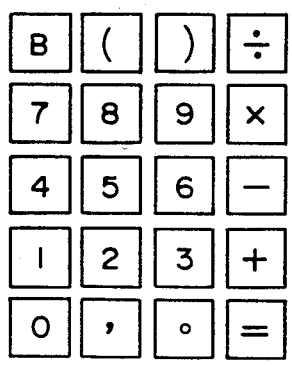
FIG. 2 is a front view of an input keyboard.
Figure 3:
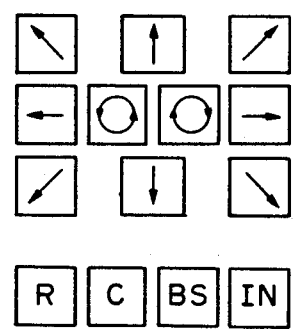
FIG. 3 is a front view of a symbol keyboard.
Figure 4:
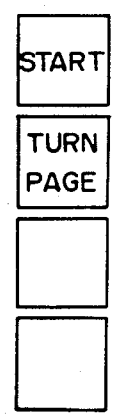
FIG. 4 is a front view of a function keyboard.

The apparatus for preparing numerical control information includes a keyboard section, as shown in FIG. 1, for entering information. This section includes an input keyboard 1 provided with such keys as numeric keys, an addition key, subtraction key, multiplication key, division key and keys for a comma and parentheses, as depicted in FIG. 2, a symbol keyboard 2 having symbol keys used to express the figures shown on a blueprint, and keys such as an IN key for loading data into memory, as illustrated in FIG. 3, and a function keyboard 3 provided with a TURN PAGE key and other function keys, as shown in FIG. 4. The apparatus further includes a graphic display screen 4 that makes use of a CRT. The display screen 4 has an upper portion which includes a horizontal section for displaying input data item identification, a central portion for displaying input data and graphics as well as preset data which has been called, and a lower portion which includes a horizontal section for displaying input information. This section displays inquiries made by the present apparatus, and the operator's responses to the inquiries. A terminal 5 in FIG. 1 is adapted to send data from the apparatus to an NC information output unit such as a tape puncher, a portable bubble cassette or a cassette magnetic tape. A terminal 6 is adapted to send data from the apparatus to an NC interpolator.

The system and apparatus described above permits an ordinary technician to prepare an NC tape simply and accurately without the use of special language, and allows production speed to be increased in comparison with the prior art.

While the equipment for entering data into the present apparatus generally employs a keyboard of the type described above, a data input unit using a Rand tablet may be employed to input the data, or a device that enables inputs to be made orally can be substituted for the keyboard. Using either of the latter arrangements makes it much easier to input graphics than with the keyboard arrangement. It is of course possible to use the keyboard for entering data such as numerical values, and to use the Rand tablet or oral arrangement solely for the input of graphics.

To facilitate the understanding of the present invention, the inventive system will be described for a case in which numerical control information relating to a turning operation is prepared.

(1) Selection of coordinate system

When the START key on the function keyboard shown in FIG. 4 is pressed, graphics and characters relating to coordinate system selection are displayed on the graphic display screen 4 depicted in FIG. 1. In other words, the screen 4 presents a display of four diagrams representing first, second, third and fourth angle projections, along with numerals 1, 2, 3, 4 representing the respective quadrants corresponding to the four displayed graphics. In addition, a numeral 1, 2, 3 or 4 is displayed in a section reading "PRESENT COORDINATE SYSTEM:". The numeral is that of a single coordinate system preset as an initial value. Further, the lower portion of the screen, namely an input information display section 51, reads "COORDINATE SYSTEM=" and presents a display of the information entered by the operator. The operator, depending upon the quadrant in which the part is represented on the blueprint, and using the input keyboard 1 and symbol keyboard 2, shown in FIGS. 2 and 3, respectively, presses the "1" key and then the IN key, the "2" key and then the IN key, the "3" key and then the IN key, or the "4" key and then the IN key, thereby to supply the present apparatus with the data indicating whether the blueprint has been prepared by the first, second, third or fourth angle projections. The coordinate system corresponding to the numerical values input by this operation is used throughout the data processing that follows. When the preset value (i.e., the preset coordinate system) is to be used as is, the operator need merely press the IN key.

When the selection of the coordinate system is completed in this manner, the number of the new coordinate system, selected and entered into the present apparatus in the above fashion, is displayed in the "PRESENT COORDINATE SYSTEM:" section.

Instead of displaying the data for all four quadrants on the CRT screen simultaneously and then selecting the desired data as described above, it is possible to display the coordinate systems individually in sequence and then select the coordinate system which is desired.

Operation shifts to the next item following the input of the total data necessary for selecting the coordinate system.

(2) Input of figures

Figure 6:
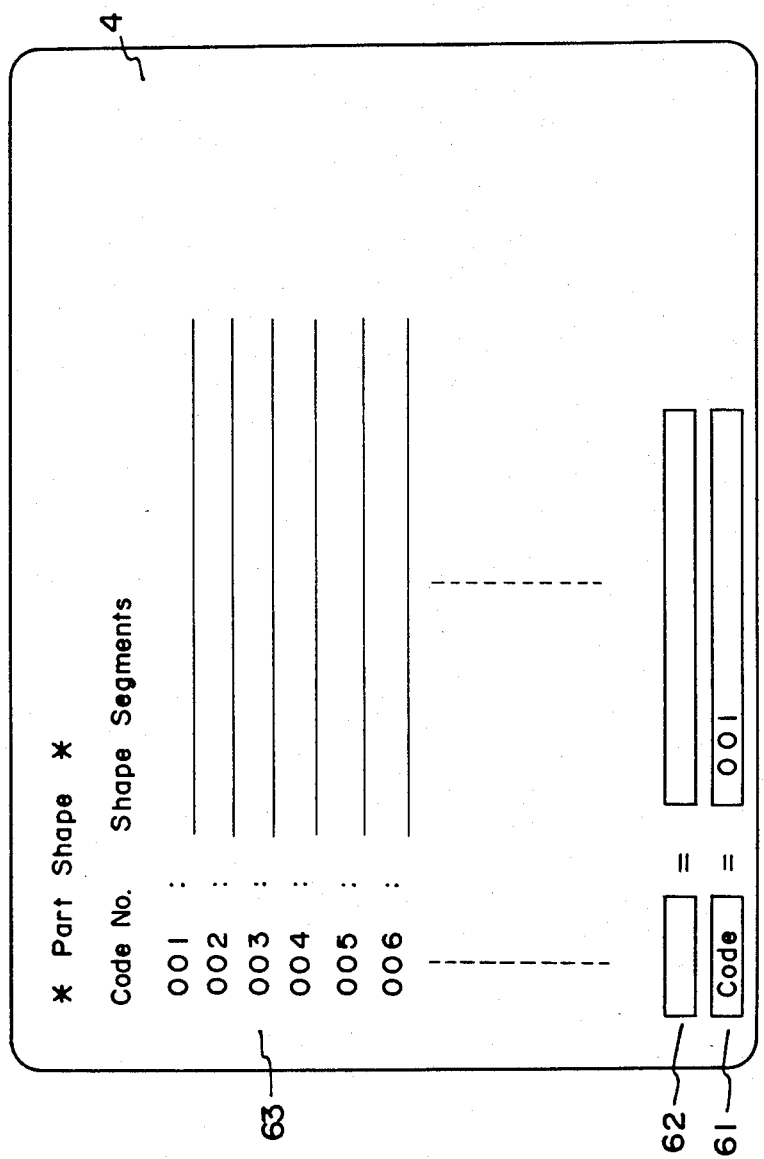
FIG. 6 is a display which appears on a display screen during the input of data relating to part shape.

Next, information necessary for inputting the graphics is displayed on the display screen 4 in the manner shown in FIG. 6. Specifically, the upper portion of the screen presents a display reading "PART SHAPE", signifying an information input operation for the shape of the particular part. Graphic inputs are not limited to one part; information relating to the shapes of a plurality of parts can be entered and stored in memory. Therefore, a registered graphics display section 63 is provided immediately below the "PART SHAPE" section. The display section 63 consists of up to several dozen lines for displaying code numbers and shapes, in symbolic form, corresponding to the respective parts. In addition, the lowermost section of the display screen 4 consists of two rows. The first row is a selected information display section 62 for displaying a code number selected from the plurality of code numbers mentioned above, as well as the graphic representation, in symbolic form, corresponding to the code number. The second row is an input information display section 61. When no information relating to the shape of a part or parts has been fed into a storage device located in the present apparatus, only the code numbers, starting from 001, appear sequentially in the registered graphics display section 63, and only the expression "CODE=" appears in the input information display section 61.

Figure 7:
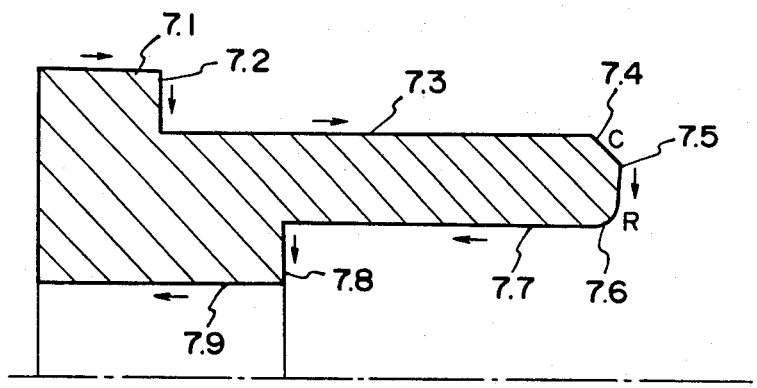
FIG. 7 is a sectional view showing the shape of a machined part.
Figure 8:
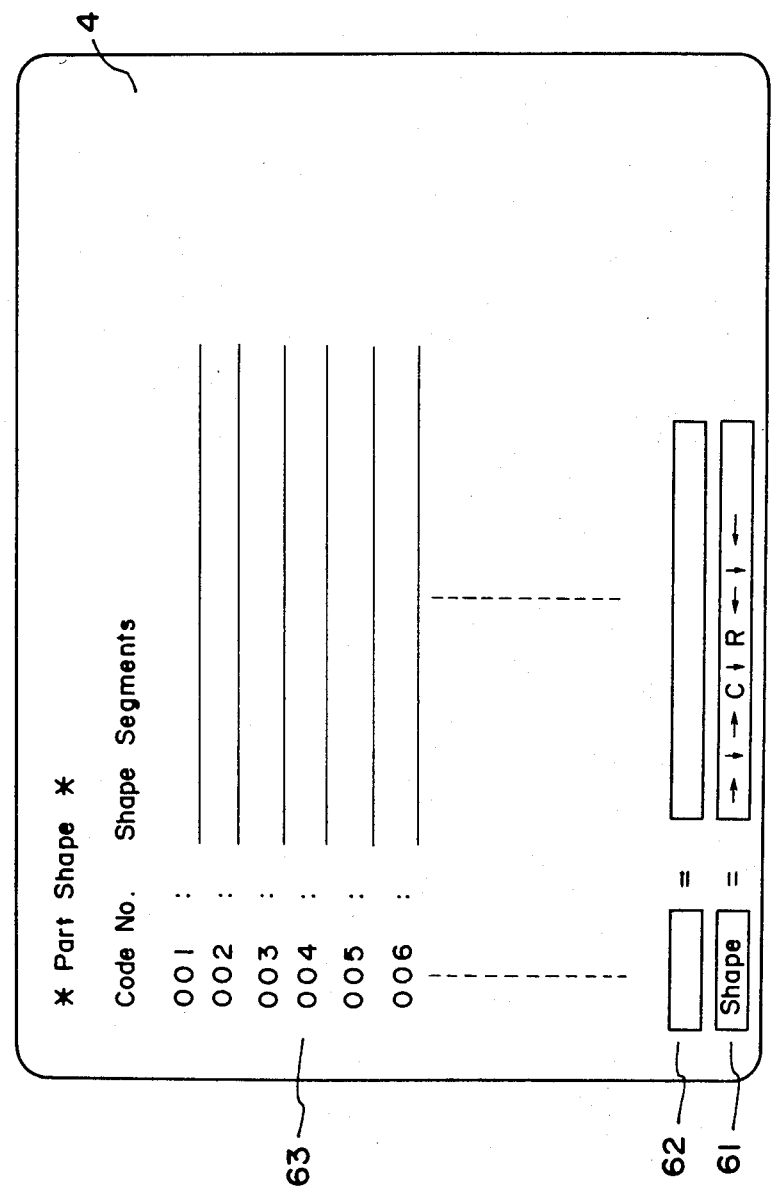

Assume that a figure drawn out on a blueprint and shown in FIG. 7 is to be input for the code number 001. In this case the operator presses the key "0" twice and the key "1" once on the input keyboard shown in FIG. 2. This causes "001" to be displayed in the input information display section 61. Next, the operator presses the key IN on the symbol keyboard of FIG. 3 to enter the code number 001 into the present apparatus. This causes "001" to be displayed in the selected information display section 62 shown in FIG. 6 and, at the same time, causes the input information display section 61 to switch over to a display reading "SHAPE=". Thus, the apparatus urges the operator to input the information regarding the configurations to be machined using the symbol keyboard 2. The operator, while referring to the graphic representation shown in FIG. 7, presses the → key corresponding to the straight line 7.1, the ↓ key corresponding to the straight line 7.2, the → key corresponding to the straight line 7.3, the C key corresponding to the corner portion 7.4, the ↓ key corresponding to the straight line 7.5, the R key corresponding to the small arc 7.6, the ← key corresponding to the straight line 7.7, the ↓ key corresponding to the straight line 7.8, and the ← key corresponding to the straight line 7.9. This causes the the symbols →, ↓, →, C, ↓ R, ←, ↓, ←, to appear successively in the input information display section 61, as depicted in FIG. 8. Lastly, the operator presses the key IN to supply the storage device in the present apparatus with the information indicated by the graphic symbols, to display the graphic symbols "→, ↓, →, C, ↓, R, ←, ↓, ←" after the code number 001 on the graphic display screen 4, and to register the graphic representation of FIG. 7 at the code number 001. At the same time, the graphic symbols "→, ↓, →, C, ↓, R, ←, ↓, ←" are displayed after "001=" in the selected information display section 62. The shape defined by the symbols displayed in the selected information display section 62 represents the shape the machined part will assume.

If it is required to input other graphics in addition to that described above, the foregoing operation is repeated to register the graphics as represented by the symbols in FIG. 9. Since the registered graphic information is not destroyed until reloading, standard graphic information of the type which appears everytime an NC tape is prepared is not destroyed at the time of NC tape preparation but is registered in the storage device of the present apparatus and need only be read from the storage device and reused when new NC information is prepared.

A case will now be described in which graphic information registered in the present apparatus is extracted and reused as input information.

Displayed after each code number in the registered graphic display section 63 is a set (figure code) of symbols which corresponds to the respective code number and which represents the registered graphic. The sets are arranged in the form of a menu which the operator scans to locate the set of symbols representing the graphic that he wishes to input. The operator, once he has found the set of symbols representing the desired graphic, punches in the code number using the input-keys shown in FIG. 2. For example, assume that the operator wishes to call the graphic registered at code 001. In this case, the operator presses the keys "0", "0", "1", in that order, causing the code number "001" to appear in the input information display section 61, as shown in FIG. 9, and causing the "CODE=" display to change to the "SHAPE=" display, also as shown in FIG. 9. At the same time, "001=→ ↓ →C ↓ R← ↓ ←" appears in the selected information display section 62. Then, upon checking that the displayed symbols and the shape of the part drawn out on the blueprint are correct, the operator presses the IN key. The graphic information displayed in the selected information display section 62 therefore serves as the information for the next machining operation.

When the operator calls a previously registered graphic and wishes to modify its content upon checking the shape of the part, he presses the symbol key or keys for the new shape when "SHAPE=" appears in the input information display section 61, and then presses the IN key. This modifies the content registered after the code number 001, and modifies the content of the selected information display section 62. It also causes "CODE=" to appear in the input information display section 61. Other previously registered graphic information is modified by continuing the foregoing series of operations.

The code numbers consist of three digits, as shown in FIG. 6. Graphic registration is possible for code numbers up to 999 if the storage capacity so permits, but it would be quite impossible to display the information corresponding to all 999 code numbers simultaneously on the same display screen. Any of several expedients can be adopted to deal with this situation. For example, the function keyboard 3 can be provided with a TURN PAGE key, as shown in FIG. 4, or it is possible to adopt an arrangement in which, when the code number is entered in the input information display section 61, the page including that code number is also displayed. Or, in another alternative, an arrangement can be adopted wherein code numbers are advanced sequentially to display the registered codes and graphic symbols one after another, thereby enabling a search of a large number of codes and graphics.

In the embodiment described above, the shapes and directions of line segments defining the contour of a part expressed on the blueprint are represented by arrows and characters, though they are actually stored in memory as numerals and characters. When the information in the storage device is displayed on the display screen 4, a generator is used to convert the numerals into the arrow symbols so that said information can be displayed in an easily understandable fashion in the form of arrows and characters. If the generator is considered too costly, a table showing the correspondence between the arrow symbols and numerals can be prepared, as shown in FIG. 10, so that numerals can be employed instead of the arrows to express the shapes of the line segments. This makes it possible to dispense with the generator for the number-to-arrow conversion, and even with that portion of the keyboard 2 used to input the arrows for the graphic display, in which case keyboard 1 could be used to input the graphics. This would enable the present apparatus to be provided at a lower cost.

FIG. 11 shows a comparison between shape codes corresponding to code numbers when the shape codes are expressed as numerals and characters (alphanumerics), and the shape codes when they are expressed in terms of the shape symbols, namely the arrow marks. FIG. 11 also shows the contours of parts corresponding to the respective shape codes.

FIG. 12 shows an example in which the shape codes corresponding to the code numbers are displayed on the display screen 4 in terms of both the shape symbols (arrows and characters) and alphanumerics.

There are many cases where an auxiliary portion such as a flange or boss is added to a certain fundamental shape in order to provide the desired part. The present invention allows this to be accomplished by adding a previously registered shape code for the auxiliary portion to the previously registered shape code for the fundamental shape. This will now be described in greater detail.

First, assume that the input information display section 61 reads "CODE=". Using the input keyboard, the operator punches in a code number, such as "003", for the new shape, and enters this code by pressing the IN key. This causes the input information display section to change over to the "SHAPE=" display. Now assume that the operator wishes to combine the shape specified at code number 001 and the auxiliary shape specified at code number 002 to create a new shape code, as shown in FIG. 13. In this case the operator uses the input keyboard 1 to punch in "001+002", and then presses the IN key to enter this data. This in effect inputs the shape code or shape symbol group of the type specified at code number 003 in FIG. 13. The shape corresponding to this code number is shown at the lower right-hand side of FIG. 13.

The above operation is not limited to the addition of two code numbers but can be used to add three or more code numbers as well.

Operation shifts to the next item following the input of the total data necessary for entering the graphics in the manner described above.

(3) Input of shape and dimensions of starting stock

Figure 14:
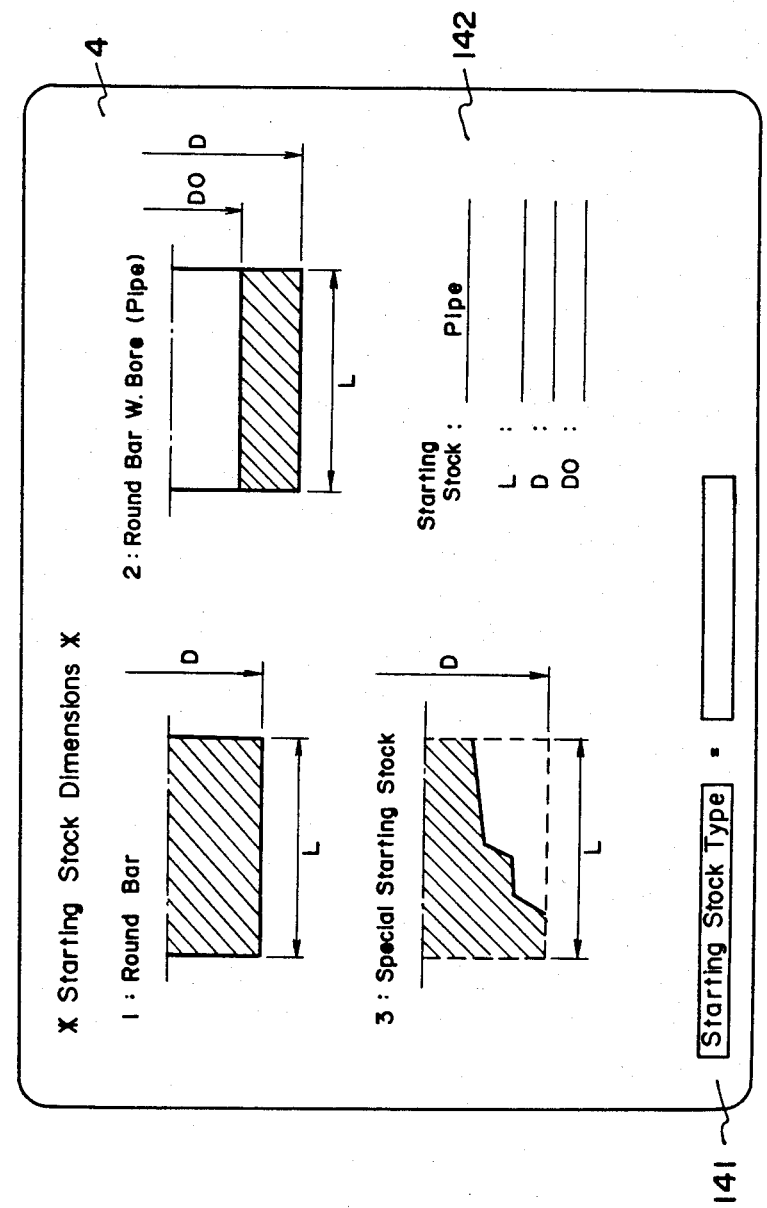
FIG. 14 is a display which appears on a display screen during the input of data relating to starting stock dimensions.

The graphic display screen 4 displays information corresponding to stock dimension inputs, as shown in FIG. 14. Specifically, the upper section of the display screen now reads "STARTING STOCK DIMENSIONS", signifying an information input operation for the shape and dimensions of the starting stock. Starting stock to be subjected to a turning machining operation may be broadly classified into round bar stock, pipe stock and stock of a special shape. The screen 4 displays the shape of each stock type, shape numbers 1, 2 and 3 corresponding to the stock shape, and specified dimensions (outer diameter, inner diameter and length) for each stock shape, the dimensions being identified by D, $D_o$ and L, respectively. The horizontally extending phantom lines in the graphic displayed on screen 4 in FIG. 14 represent the axes of revolution (turning center) of the corresponding starting stock.

When the starting stock employed at a factory includes a number of specimens of standardized shape and dimensions, entering such shape and dimension data individually each time an NC tape is prepared is a troublesome task. The lower right-hand portion of the display screen 4 therefore is provided with a set value display section 142. Specifically, the arrangement is such that the values indicating the standardized shapes and dimensions are registered in advance and then used as they are whenever necessary. The set value display section 142 displays these shape and dimension values which will have been registered earlier in the manner described above. Provided at the lowermost portion of the display screen 4 is an input information display section 141 that initially presents a display reading "STARTING STOCK TYPE" which is an inquiry addressed to the operator.

The operator, viewing the display screen 4, selects the number (1, 2 or 3) conforming to the starting stock which will be machined, punches in the number using the input keyboard shown in FIG. 2, and then enters the number by pressing the IN key on the symbol keyboard. For example, assume that the starting stock is a round bar. In this case the operator presses the "1" key and then the IN key. If the starting stock is a pipe, he presses the "2" key and then the IN key, and if it is a starting stock of a special shape, he presses the "3" key and then the IN key. Thus, the present apparatus is supplied with the desired stock shape input. If, by way of example, the operator has selected the pipe shape, the "PIPE" will be displayed in the set value display section 142 after the inquiry "STARTING STOCK TYPE".

When the stock shape input operation is completed in the manner described above, the "STARTING STOCK" inquiry vanishes and the inquiry "L=" appears. The operator therefore uses the input keyboard 1 to punch in the numerical value for the length of the starting stock, and then presses the IN key on the symbol keyboard. This causes the length information to enter the present apparatus and to be displayed in the set value display section 142. At the same time, the inquiry "L" vanishes and the inquiry "D" appears in the input information display section 141. Now the operator uses the input keyboard to type in the outer diameter of the starting stock, and then presses the IN key. This enters the outer diameter information in the present apparatus, displays the outer diameter in the set value display section 142, and switches the inquiry from "D" to "$D_o$". Now the operator uses the input keyboard to specify the inner diameter of the starting stock, and then presses the IN key. This enters the inner diameter information in the present apparatus and displays the inner diameter in the set value display section 142. This operation ends the input of information regarding the stock dimensions.

If the starting stock type selected by the operator is the stock having the special shape (in which case the operator presses the keys "3" and IN as described above), the operator enters the information giving the length and outer diameter of the stock. Information specifying the special shape of the stock is entered via the same method described above in connection with the entry of the graphic information specifying the contours of the completed parts. The dimensions of each portion of the special starting stock must also be entered but, since the method of doing so is the same as that for inputting part dimensions, which will be described next, the method will not be explained in this section.

(4) Input of part dimensions

Figure 15:
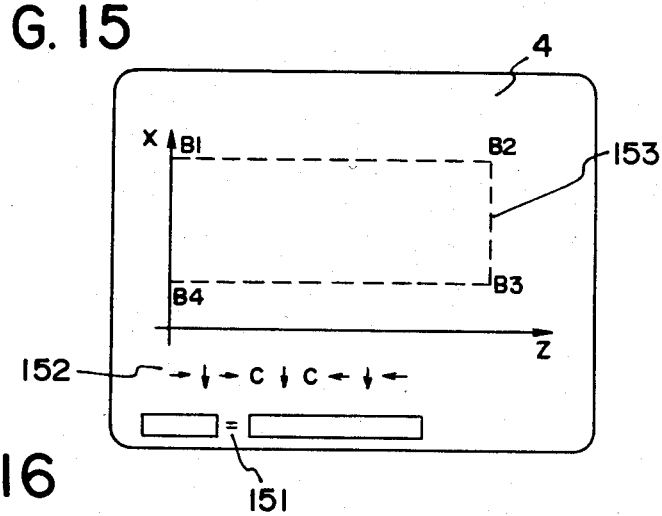
Figure 16:
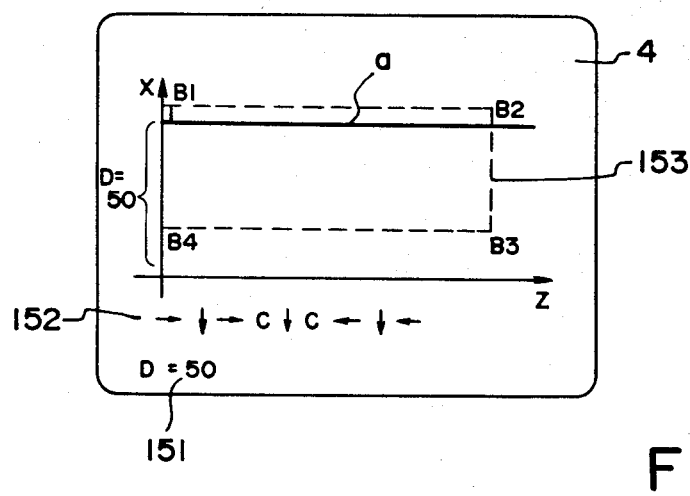
Figure 17:
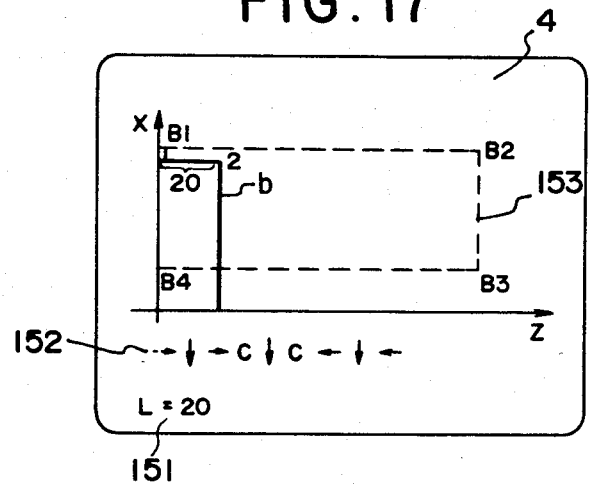

When the operation for entering the shape and dimension information relating to the starting stock has been completed, the starting stock shape previously selected in the manner just described is displayed on the screen 4 in the section 153 in the form of a dashed line. The figure of the starting stock is of a size conforming to the input dimensions, and it is displayed using the previously selected coordinate system. Characters $B_1$, $B_2$, $B_3$, $B_4$ are displayed at the respective corners of the figure. The example depicted in FIG. 15 is for pipe starting stock, using a first quadrant coordinate system (coordinate system for a first angle projection). Displayed in section 152 is a group of previously input shape symbols specifying the contour of a part. The section 151 at the lowermost portion of the screen 4 displays inquiries regarding part dimensions, the operator responding to the inquiries by inputting dimensional values using the input keyboard 1 shown in FIG. 2. The inquiries for the necessary dimensions that appear in section 151 are displayed in the same order as the shape symbol inputs specifying the part shape. In other words, the first dimensional inquiry corresponds to the shape symbol at the far left of section 152, with the inquiries following the order of the shape symbols from left to right. The present apparatus comprehends each entry of dimension data made by the operator and responds by drawing out the contour of the part as the corresponding item of data is received. For example, in FIG. 15, the inquiry "D=" appears in section 151 with regard to the shape symbol → displayed at the far left of section 152. The operator responds to the inquiry by inputting the value "50" which will then appear after the "D=" in section 151, as shown in FIG. 16. The present apparatus immediately responds by drawing out a straight line a (x=50) and by displaying a serial number "1" at the starting point of the line. The serial number is for identifying a particular point on the part, as will be described later. Next, the inquiry that appears in the section 151 is "L=" relating to the length of the straight line segment a just drawn. The operator responds by entering the prescribed dimensional value. For example, using the input keyboard 1, the operator punches in the value "20" and then presses the IN key on the symbol keyboard 2. This causes the line a to be divided into a segment corresponding to the length "20", with the serial number "2" appearing at the end point of the line segment, as shown in FIG. 17. It will be seen that the shape symbol → at the far left of section 152 vanishes when the dimensional value concerning this symbol has been fed into the present apparatus. Next, processing is executed for the shape symbol ↓. This is accomplished by direction and length processing for a line segment b in a manner entirely similar to that just described. Specifically, the shape to be processed is given by ↓. Accordingly, a downwardly directed, vertically extending straight line b is drawn on the screen 4 starting from serial number "2", as depicted in FIG. 17. The operator, in response to an inquiry "D=" regarding the length of the drawn line b, enters the prescribed value using the input keyboard. For example, if the operator enters the value "40" and presses the IN key, the line b is divided into a segment whose end point corresponds to a diameter of "40", as shown in FIG. 18. A serial number "3" appears at said end point. It will be seen that the second shape symbol ↓ vanishes from the screen 4 when the operator has completed entering the dimensional information concerning said shape symbol. Next, in accordance with the shape symbol →, the present apparatus draws out a rightwardly extending straight line c from the end point of the line segment b, as shown in FIG. 18. The operator then follows the procedure described above to set the length of a line segment c shown in FIG. 19. The operator continues processing data in this manner, the data being obtained from a part drawing similar to that shown in FIG. 7, but with the prescribed dimensions having been added thereto. In accordance with this procedure, a graphical representation of the type shown in FIG. 20 is drawn out on the display screen 4. This completes the entry of the part dimensions.

When inputting the dimensions there will be cases where, say, a length of 100 mm is to be divided into 30 mm and 70 mm portions, with the 30 mm data and 70 mm data being entered separately, but where the 30 mm data is not written on the blueprint. When such is the case, if "100−70" is entered consecutively using the input keyboard and the IN key is then pressed, the 30 mm data will enter the present apparatus. Data can be entered in a similar manner using addition, subtraction, mulitiplication and division operations.

(5) Designation of rough machining areas

When the operator has completed entering the information relating to part dimensions, the words "DESIGNATION OF ROUGH MACHINING AREAS" appear superimposed on the graphic of FIG. 20, as shown in FIG. 21.

Both the cutting tool and machining procedure differ depending upon the area of the starting stock to be machined by turning. Specifically, they differ depending upon whether the inner or outer diameter of the starting stock is to be cut, or upon whether the end faces of the starting stock are to be cut. Machining areas must therefore be decided in accordance with the particular machining objective.

To machine the starting stock into the previously input shape shown in FIG. 20, the starting stock is divided into an external machining area S, internal machining area T and end machining area U. To accomplish this, the operator uses the input keyboard shown in FIG. 2 and the shape symbol input keyboard shown in FIG. 3 to punch in "B", "5", "=", "5" and "←", and then presses in IN key. The apparatus responds by drawing an upwardly extending dotted line V from the point marked by serial number "5" on the part contour being displayed on the screen 4, and by attaching the label "B5" to the intersection of this line with the dotted line connecting points B1 and B2. Next, the operator punches in "B", "6", "=", "6" and "←" and then presses the IN key, whereupon the apparatus responds by drawing a downwardly extending dotted line W from the point marked by serial number 6, and by attaching the label "B6" to the intersection of this line with the dotted line connecting points "B3" and "B4". Providing the new points B5 and B6 in this manner divides the figure of the starting stock into the external, internal and end face machining areas S, T and U, respectively, and enters the corresponding information in the present apparatus at the same time.

Figure 22:
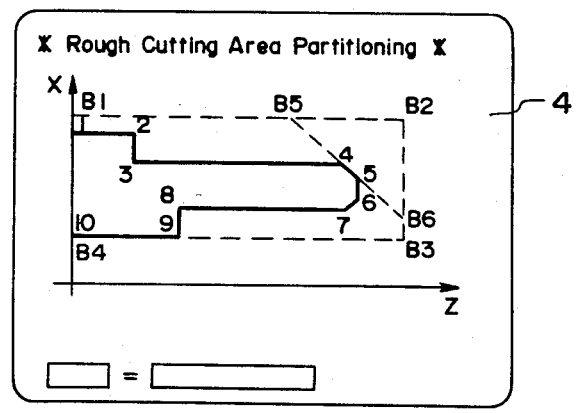
FIG. 22 is another display which appears on a display screen during the input of data relating to machining areas.

The operator may choose to divide up the machining areas in a different manner. If he punches in "B", "5", "=", "4", "∖" and presses the IN key, and then punches in "B", "6", "=", "5", "∖" and presses the IN key, the points B5, B6 are obtained as shown in FIG. 22, allowing the operator to designate a different set of rough machining areas.

Employing the foregoing methods allows the operator to designate rough machining areas at will. When the input of information necessary for the rough machining area designation has been completed, operation shifts to the next step.

(6) Designation of machinging starting point

Figure 23:
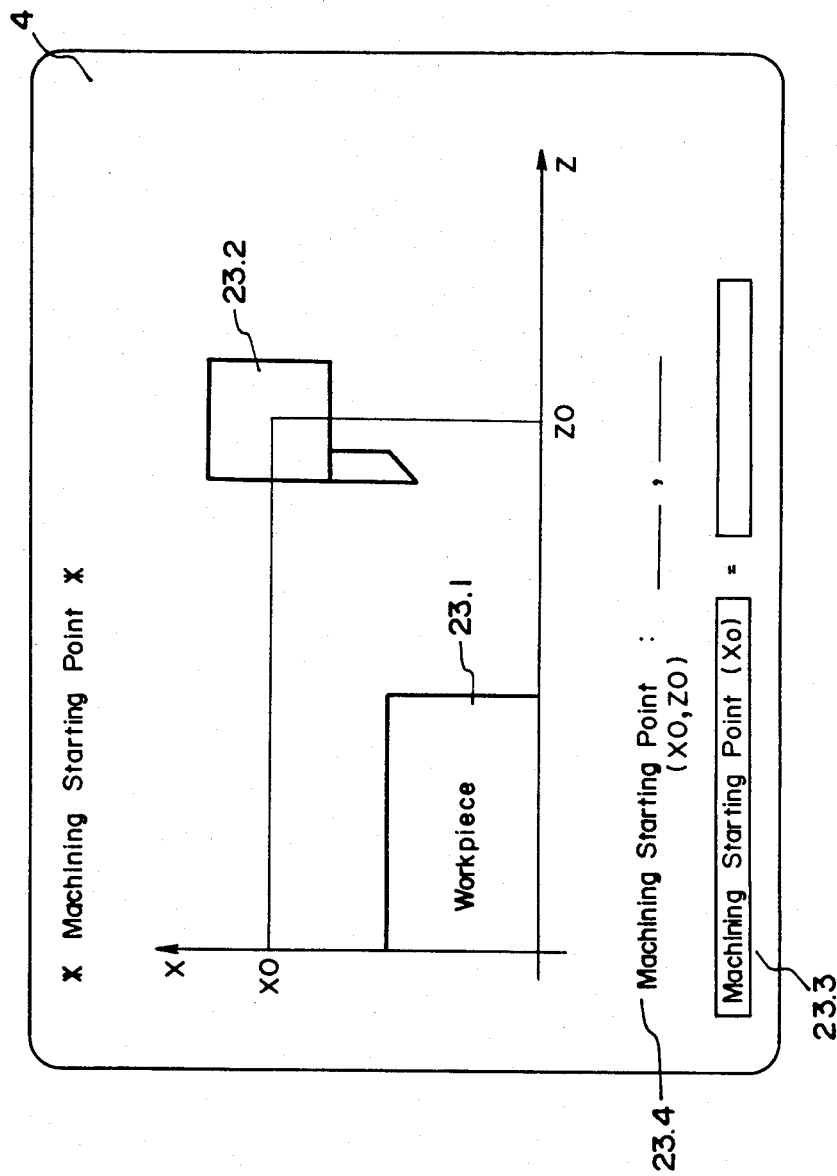
FIG. 23 is a display which appears on a display screen during the input of data relating to a machining starting point.

The graphic display screen 4 displays information for designating the machining starting point, as depicted in FIG. 23. Specifically, the uppermost portion of the screen reads "MACHINING STARTING POINT", signifying a machining starting point instruction. Drawn out at the central portion of the screen on the selected coordinate system are a workpiece 23.1 and a tool 23.2. The input information display section 23.3 at the lowermost portion of the screen 4 presents a display reading "MACHINING STARTING POINT $(X_o)=$", requesting that the operator input the $X_o$ coordinate of the machining starting point. The operator complies by punching in the $X_o$ value using the input keyboard 1 and then by pressing the IN key on the symbol input keyboard 2. This applies the value of $X_o$ to the present apparatus as an input and causes the inquiry "MACHINING STARTING POINT $(Z_o)=$" to appear in the input information display section 23.3, thereby requesting that the operator enter the value of $Z_o$. He responds by entering the value in the same way that he entered the value of $X_o$.

It should be noted the previously registered machining starting point data is displayed in the input information display section 23.4. When the operator wishes to make use of this data, he merely presses the IN key on the symbol input keyboard in response to an inquiry.

The next operation starts when the input of information necessary for designating the machining starting point has been completed.

(7) Selection of appropriate tools

The graphic display screen 4 is adapted to display information relating to the selection of appropriate tools, as shown in FIG. 24. The uppermost portion of the screen reads "TOOL TYPE". Displayed immediately therebelow is list of tool types, in the form of a menu, which the operator scans to located the desired tool. A tool number precedes each tool type to facilitate tool selection. The input information display section 24.1 displays an inquiry "NO=" requesting that the operator perform a tool selection. The operator responds by punching in the tool number using the input keyboard 1 and then by pressing the IN key on the symbol input keyboard 2. This inputs the information for the selected tool and permits the operation to shift to the next step.

(8) Designation of appropriate tool information

Figure 25:
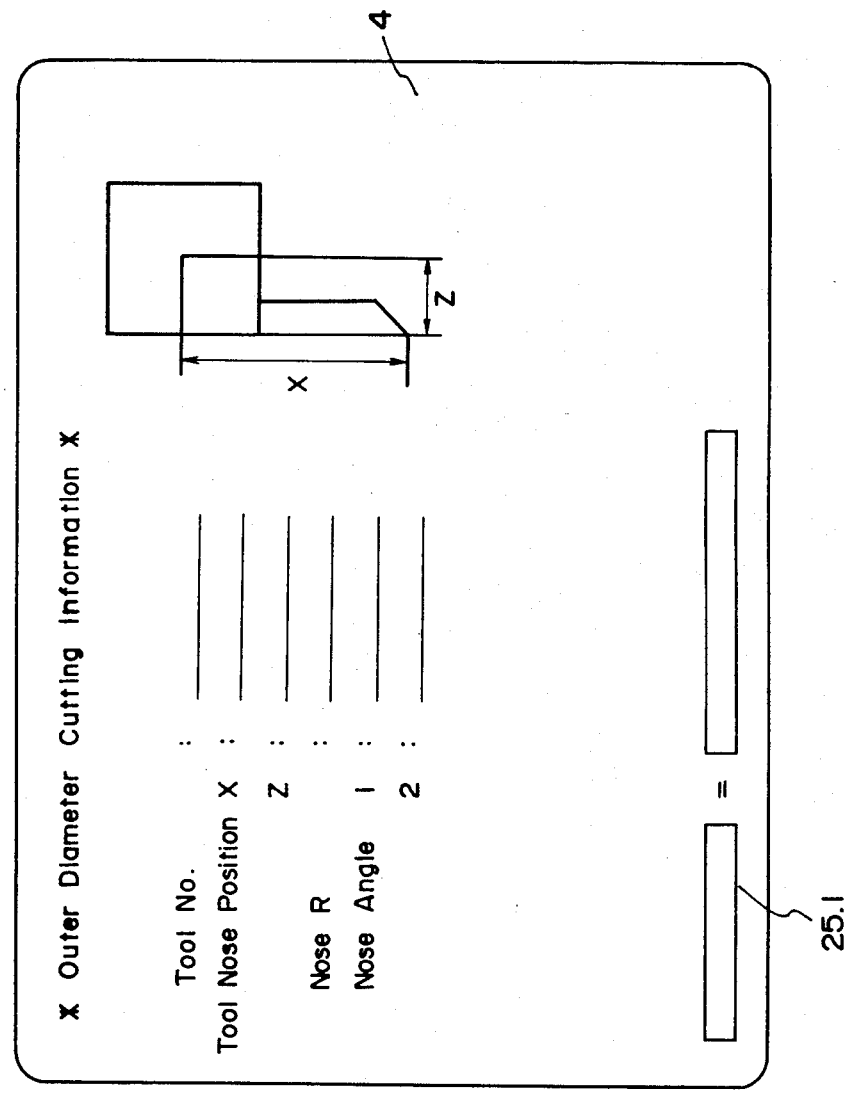
FIG. 25 is a display which appears on a display screen during the input of data for specifying a selected tool.

The graphic display screen next displays information relating to the designation of appropriate tool information, as illustrated in FIG. 25. The uppermost portion of the screen reads "OUTER DIAMETER CUTTING TOOL INFORMATION". The screen displays also the item, numerical value and figure for specifying the appropriate tool. For example, assume that the operator has selected the tool No. 2 for "OUTER DIAMETER CUTTING" in the foregoing tool selection step in order to cut the outer diameter of the workpiece, the tool having been selected from the list displayed on the screen 4, as shown in FIG. 24. The input of the pertinent information causes the screen 4 to display items necessary for the outer diameter cutting tool information, numerical values preset for this particular tool, and the figure of the cutting tool to facilitate the operator's understanding of the situation. The input information display section 25.1 at the lowermost portion of the screen 4 makes requests for the necessary data, the operator responding by entering numerical values as each inquiry appears. In other words, when the inquiry "TOOL NUMBER" appears in the input information display section 25.1, the operator enters, say, tool number "01" by pressing the appropriate keys on the input keyboard 1 and then be pressing the IN key on the symbol keyboard 2. Inputting this information causes "01" to appear after "TOOL NUMBER" in the central portion of the screen, and causes the inquiry "NOSE POSITION X:" to appear in the input information display section 25.1. The operator responds by using the numerical keys on the input keyboard to punch in the value for the X dimension drawn on the screen 4 at the right-hand side, and by pressing the IN key on the symbol input keyboard. This enters the appropriate information and causes the input value to be displayed after "TOOL NOSE POSITION X" at the central portion of the screen. The operator continues responding to the inquiries in the above fashion to sequentially enter the tool information. If the operator wishes to employ preset values in responding to the inquiries, he need merely press the IN key after the particular inquiry appears.

More than one tool may be used to machine a single part; several tools are commonly used in practice. When all of the necessary data with respect to a single tool has been entered in the manner described above, the image displayed on the screen 4 returns to that shown in FIG. 24 to permit the selection of another tool. The selection of tools and the entry of the necessary information for each tool are repeated for as many tools as necessary. When the image on screen 4 returns to that shown in FIG. 24 following the input of the total tool information, the operator presses the "0" key and then the IN key to end the process and to shift operation to the next step.

(9) Designation of machining schedule and processing of machining schedule

Figure 27:
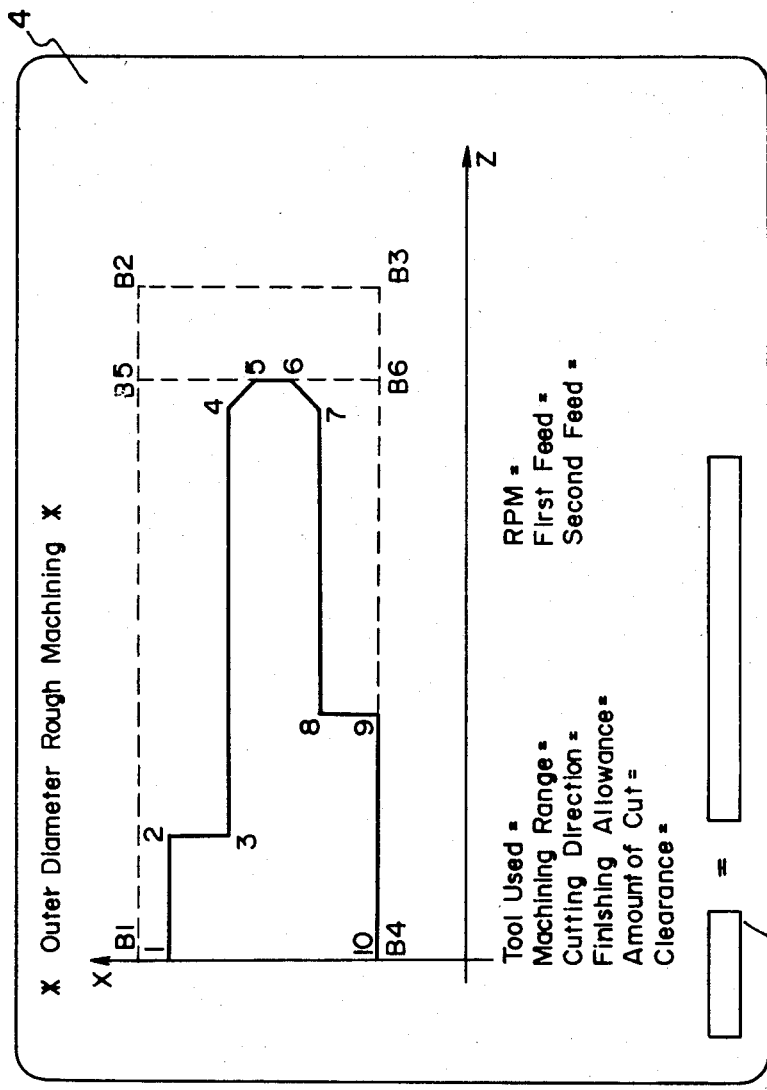
FIG. 27 is a display which appears on a display screen during the input of data required for processing a machining schedule.

When all of the necessary tool information has been entered by the operator, a display relating to machining schedule information appears on the display screen 4, as shown in FIG. 26. The upper portion of the screen reads "MACHINING TAPE". Displayed immediately therebelow is a menu of various machining operations. In addition, numbers are displayed before each machining operation indication in order to assist the operator in selecting the machining schedule. The input information display section 26.1 at the lowermost portion of the screen displays a "NO=" inquiry, requesting that the operator select a machining schedule. The operator responds by punching in the number of the required machining operation and then by pressing the IN key. For example, to select the "OUTER DIAMETER ROUGH MACHINING" operation, the operator presses the "3" key and then the IN key, whereby the information appearing on the screen 4 is replaced by material relating to rough machining of the outer diameter as shown in FIG. 27, in order to permit the present apparatus to begin processing for automatic preparation of NC information.

Thus, in the manner described above, the present apparatus is supplied with input data necessary for preparing NC information. This data includes the shape and dimensions of the starting stock, the shape and dimensions of the finished part, the rough machining areas, the type and dimensions of the tool or tools to be used, and the coordinates of the machining starting point. As illustrated in FIG. 27, the upper half of the display screen 4 displays, both graphically and alphanumerically, the coordinate axes, starting stock shape, part shape and rough machining areas and the like, and the lower half of the screen displays the names of items of information necessary for executing the machining operations which the operator previously selected using the display of FIG. 26. All of the above is the result of the information so far entered by the operator. The input information display section 27.1 at the lowermost portion of the screen 4 displays inquiries to which the operator responds as they appear. Data frequently used in each item can be preset and then employed whenever necessary without having to be entered again by the operator.

Figure 28:
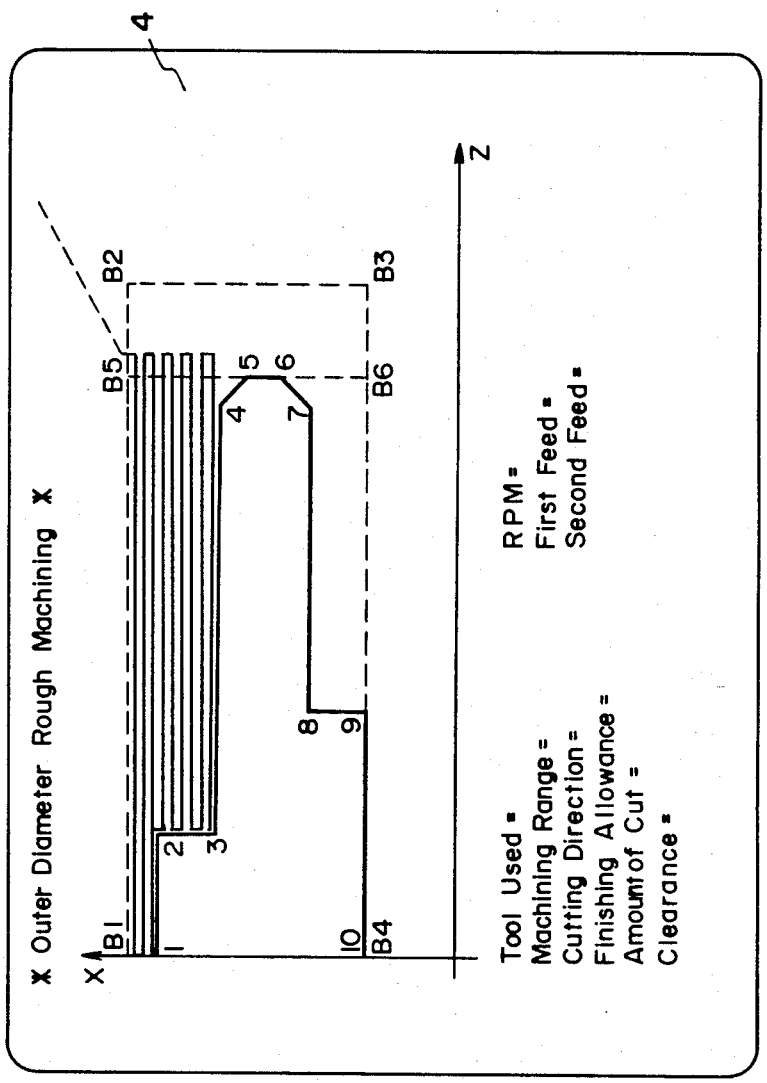
FIG. 28 is a display indicating a tool path.

When the necessary information has been entered by the operator, the present apparatus computes the tool path and draws out the tool path on the screen 4 as shown in FIG. 28. The derived data is converted into NC data for the particular NC machine tool by means of a post-processor program and is then fed out through the terminal 5 to a tape puncher to prepare an NC tape. Alternatively, the data may be sent through the terminal 6 to a pulse distributor to control the NC machine tool directly.

Upon the completion of such processing, the present apparatus returns to the machining schedule selection step illustrated in FIG. 26 and stands by for numerical inputs from the operator in order to prepare subsequent machining information.

(10) Input of shape and dimensions of special starting stock

Figure 29:
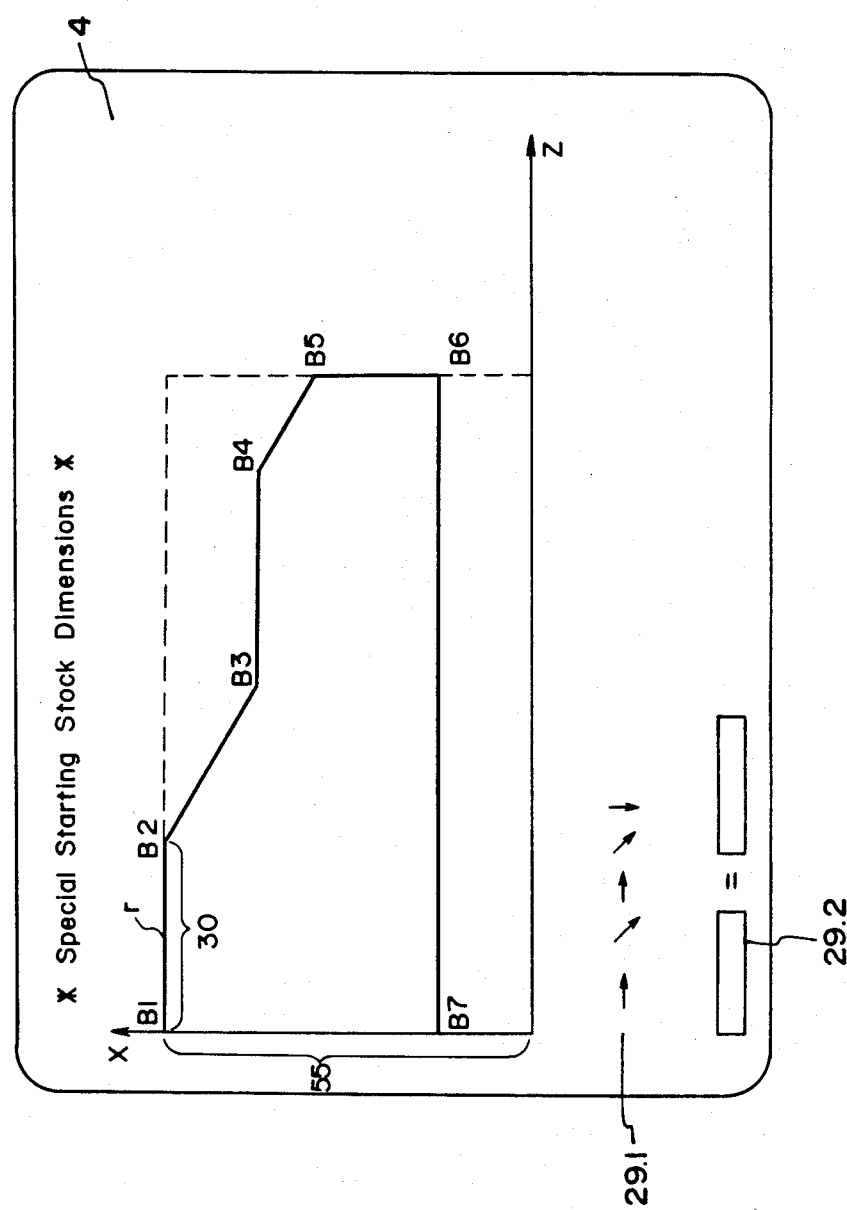
FIG. 29 is a display which appears on a display screen during the input of data relating to the dimensions of a special starting stock.

In the selection of starting stock shape described above in connection with Item (3), there are cases where special starting stock is selected. When the operator enters the information giving the length and outer diameter of the special starting stock, the starting stock appears in the selected quadrant on the display screen 4, with the outer diameter thereof being represented by a dashed line, as shown in FIG. 29. Next, the operator follows the same method employed for entering part shapes. That is, the operator observes the figure of the displayed special starting stock and presses the proper symbol keys in accordance with the contour of the stock. This causes the section 29.1 at the bottom of the display screen 4 to display a shape code such as "→↘→↘←". The operator then presses the IN key, causing a "D=" inquiry to appear in the input information display section 29.2. When the operator responds by entering "D=55", a straight line X=55 is drawn out on the screen, and "B1" is attached to the starting point. The next inquiry to appear relates to the length of a segment r of the straight line just drawn, the inquiry appearing as "L=" in input information display section 29.2 When the operator responds by entering the value 30 for this dimension, the line segment r corresponding to the length of "30" appears as shown in FIG. 29, and B2 appears at the end point of the line segment. This completes processing for the initial shape symbol "→", said shape symbol vanishing from the left-hand side of the display screen 4. The operator repeats this input operation in a similar manner for the other shape symbols to draw the contour of the special starting stock by means of the solid line within the dashed line that represents the outer diameter of the special starting stock. The input operation for the data relating to the shape and dimensions of the special starting stock ends when the solid line has completely defined the stock shape.

The present invention has been described in connection with an embodiment relating to a turning machining operation. However, the invention can be similarly applied to other NC machining operations, such as milling and wirecut discharge machining operations.

Figure 5:
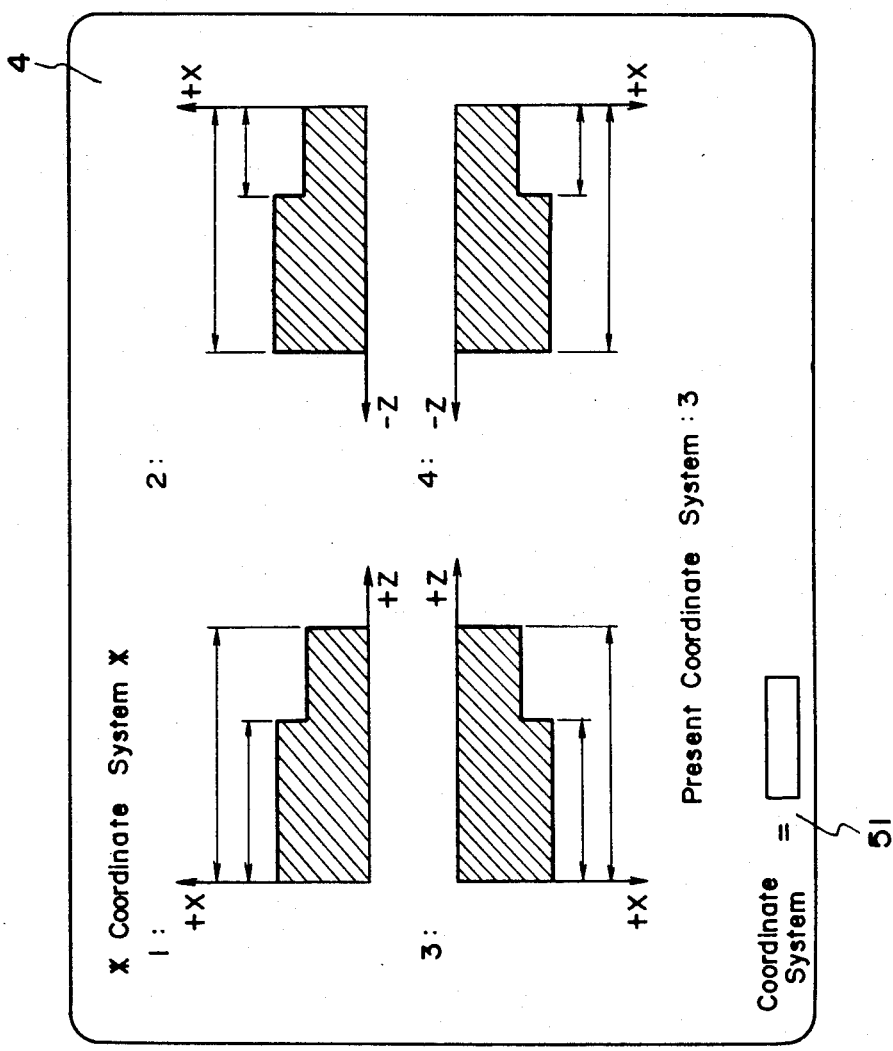
FIG. 5 is a display which appears on a display screen during the input of data relating to coordinate system selection.
Figure 30:
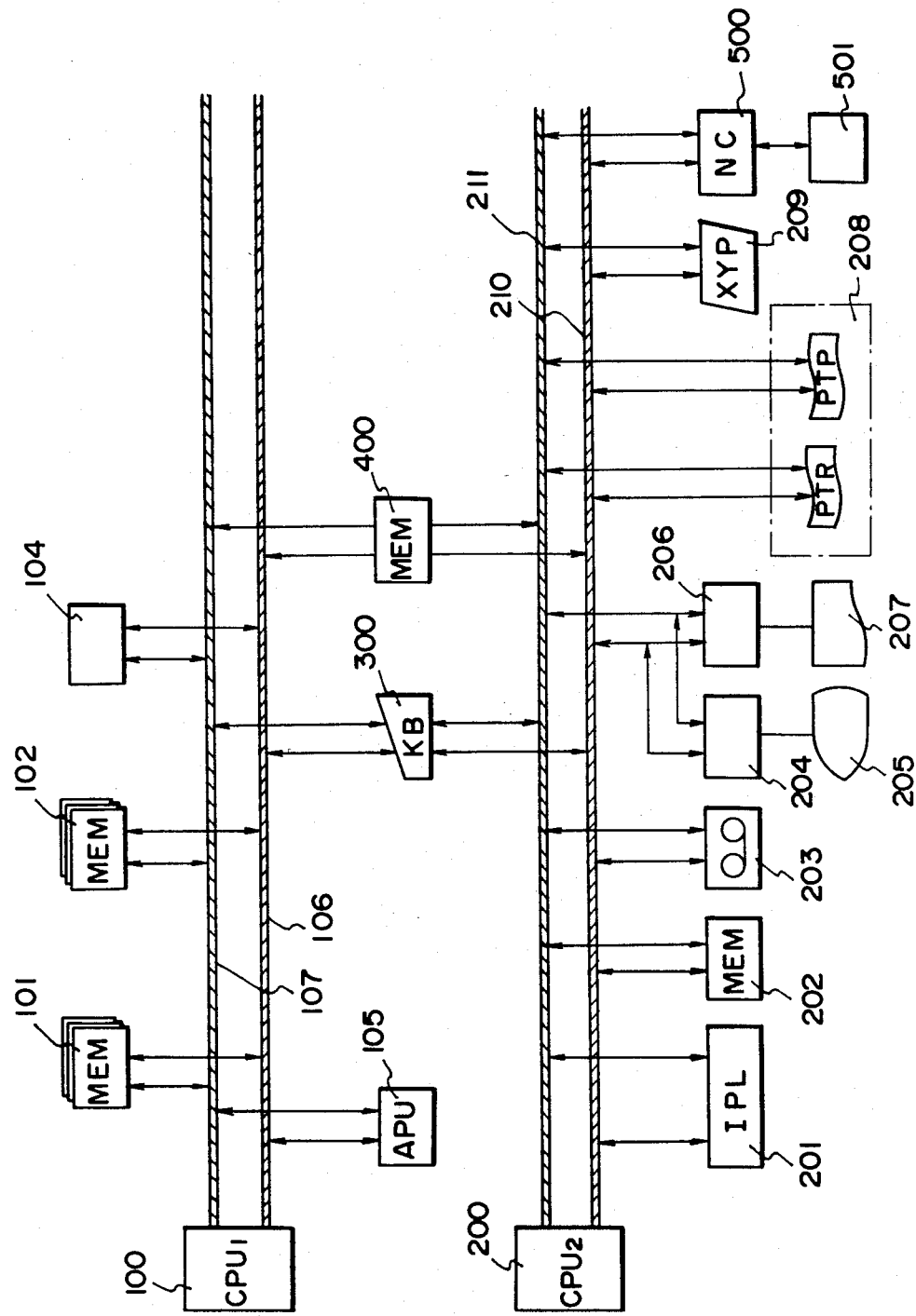
FIG. 30 is a block diagram showing the construction of the apparatus for preparing numerical control information.

FIG. 30 shows a block diagram illustrating the construction of the inventive apparatus for preparing numerical control information. A main central processing unit 100 is provided for preparing the NC information by processing the various data entering from a data input unit. A picture information memory 101 stores, picture-by-picture, all of the picture information which is displayed on the display screen 4 item-by-item. For example, such picture information consists of the graphics and alphanumerics necessary for selecting a coordinate system, as shown in FIG. 5. An input data memory 102 stores numerical values and other data input by the operator in response to inquiries which appear on the display screen 4. A control program memory 104 stores a control program. Numeral 105 denotes an arithmetic processor, 106 a data bus, and 107 an address bus.

A central processing unit 200, considerably smaller than the central processing unit 100, administers data processing on the input/output unit side. Numeral 201 denotes initial program loader, 202 a memory for storing the control program, and 203 a cassette tape memory for storing edited numerical control information and the like. A display control circuit 204 includes a character generator, a graphics generator for generating signals indicative of the graphics actually displayed on the display screen 4, a frame memory for storing one frame of graphic information and a frame memory for storing one frame of alphanumeric information. Numeral 205 denotes a CRT display, 206 a printer control circuit, and 207 a printer which enables the data displayed on the CRT display 205 to be printed out when so desired. A puncher 208 incorporates a paper tape reader PTR and a paper tape puncher PTP. Numerals 209, 210 and 211 denote an XY plotter, data bus and address bus, respectively.

Numeral 300 designates a keyboard, and 400 an interface memory for the transfer of information between the main side and input/output side. Numeral 500 denotes an NC device for controlling a machine tool 501. The latter can be accomplished under the control of the central processing unit 200 using NC information stored in the cassette tape memory 203.

Figure 31:
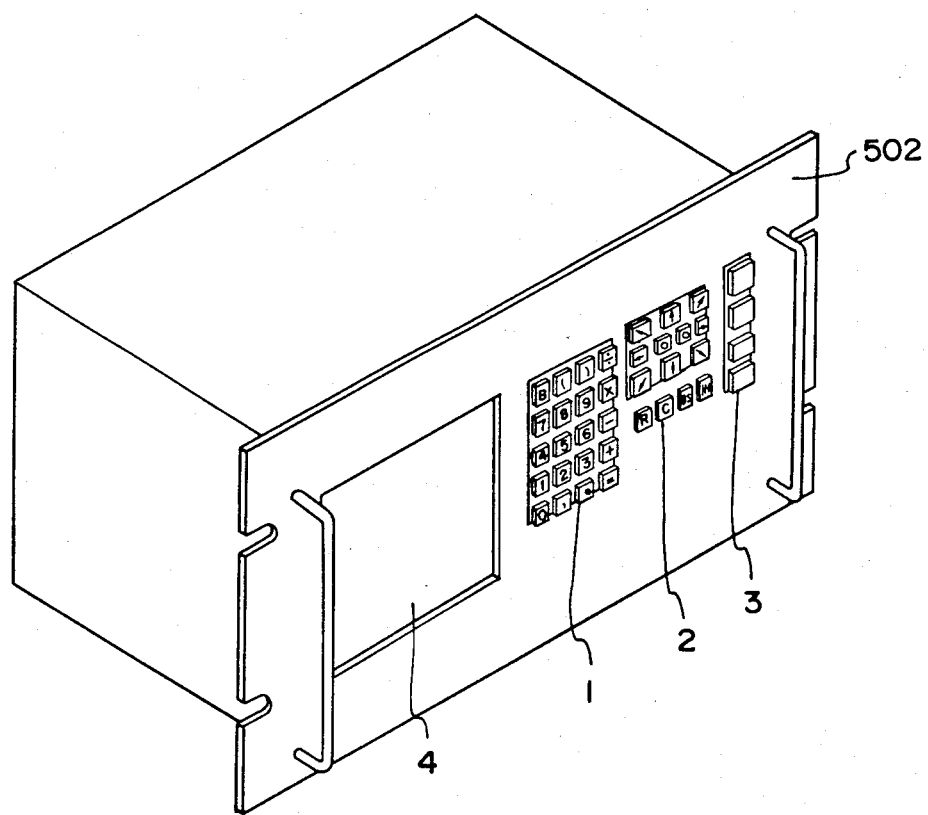
FIG. 31 is a perspective view showing another embodiment of the apparatus for preparing numerical control information.

Although not shown in FIG. 30, it is possible to provide information input devices such as a Rand tablet and audio input device in addition to the keyboard 300. Furthermore, as shown in FIG. 1, the present apparatus is provided separately from the NC device. However, for the purpose of size reduction, the present apparatus can be mounted on a panel 502, as shown in FIG. 31, and then fit into the front side of the NC device to become an integral part thereof.

As many apparently widely different embodiments of this invention may be made without departing from the spirit and scope thereof, it is to be understood that the invention is not limited to the specific embodiments thereof except as defined in the appended claims.

What we claim is:

1. A system for preparing numerical control information, comprising:
   a graphic display device capable of displaying characters, symbols and graphics;
   a data input device, operatively connected to said graphic display device, capable of inputting at least numerical values and graphic symbols, prescribed data is input in the form of numerical values and graphics in dependence upon machine tool machining information and inquiries displayed successively on said graphic display device according to a predetermined sequence, said machining information being displayed in the form of characters, symbols, graphics or a selected combination thereof, the input of said prescribed data being repeated according to a sequence necessary for the preparation of numerical control information, thereby to prepare the numerical control information, said data input device comprising a Rand tablet, operatively connected to said graphic display device, information being input by said Rand tablet; and
   a device, operatively connected to said graphic display device and said data input device, for executing the preparation of numerical control information, corresponding to the input from said data input device.

2. A system for preparing numerical control information, comprising:
   a graphic display device capable of displaying characters, symbols and graphics;
   a data input device, operatively connected to said graphic display device, capable of inputting at least numerical values and graphic symbols, prescribed data is input in the form of numerical values and graphics in dependence upon machine tool machining information and inquiries displayed successively on said graphic display device according to a predetermined sequence, said machining information being displayed in the form of characters, symbols, graphics or a selected combination thereof, the input of said prescribed data being repeated according to a sequence necessary for the preparation of numerical control information, thereby to prepare the numerical control information, said data input device comprising a Rand tablet and a keyboard, both operatively connected to said graphic display device, input data being obtained from both said Rand table and said keyboard; and a device, operatively connected to said graphic display device and said data input device, for executing the preparation of numerical control information corresponding to the input from said data input device.

3. A system for preparing numerical control information, comprising:

a graphic display device capable of displaying characters, symbols and graphics;

a data input device, operatively connected to said graphic display device, capable of inputting at least numerical values and graphic symbols, prescribed data is input in the form of numerical values and graphics in dependence upon machine tool machining information and inquiries diaplayed successively on said graphic display device according to a predetermined sequence, said machining information being displayed in the form of characters, symbols, graphics or a selected combination thereof, the input of said prescribed data being repeated according to a sequence necessary for the preparation of numerical control information, thereby to prepare the numerical control information, said data input device comprising an oral input device, operatively connected to said graphic display device, necessary data being input by said oral input device in response to an inquiry displayed on said graphic display device; and a device, operatively connected to said graphic display device and said data input device, for executing the preparation of numerical control information corresponding to the input from said data input device.

4. A system for preparing numerical control information comprising:

a graphic display device capable of displaying characters, symbols and graphics; and a data input device, operatively connected to said graphic display device, capable of inputting at least numerical values and graphic symbols, inquiries requesting an input of data are successively displayed on said graphic display device, said data input inquiries relate to coordinate system selection information, shape information, starting stock shape and dimension information, part dimension information, rough cutting area designation information, machining starting point machining information, appropriate tool selection information, appropriate tool information designation information, machining schedule designation information, and machining schedule processing information, said numerical control information relating to a figure drawn out on a blueprint and necessary data being input in the form of numerical values and graphics in dependence upon said inquiries, thereby to prepare numerical control information.

5. A system for preparing numerical control information comprising:

a graphic display device, having a display screen, capable of displaying characters, symbols and graphics;

a data input device, operatively connected to said graphic display device and including numerical value input means, operatively connected to said graphic display device, capable of inputting at least numerical values and graphic symbols; and a device, operatively connected to said graphic display device and said numerical value input means, for executing the preparation of numerical control information, figures representing selectable coordinate systems and numerical values corresponding thereto are displayed on said display screen, and a coordinate system, corresponding to numerical information input from said numerical value input means on said data input device, being used in the preparation of numerical control information.

6. A system for preparing numerical control information according to claim 5, wherein said data input device includes a keyboard and a Rand tablet both operatively connected to said graphic display device and to said preparation device, wherein said display screen is divided into a plurality of display sections in each of which is displayed a graphic representing a selectable coordinate system, the pressing of a key on said keyboard serving as display section designation information, or coordinate values input from said Rand tablet serving as the display section designating information, the coordinate system which is displayed in the designated display section being used in the preparation of the numerical control information.

7. A system for preparing numerical control information comprising:

a graphic display device having a display screen capable of displaying characters, symbols and graphics;

a data input device, operatively connected to said graphic display device and said display screen therein, capable of inputting at least numerical values and graphic symbols; and a device, operatively connected to said graphic display device and said display screen therein and to said data input device, for executing the preparation of numerical control information, a plurality of shapes representing selectable coordinate systems are sequentially displayed on said display screen of said graphic display device and desired shapes are selected, the selected coordinate system being used in order to prepare numerical control information.

8. A system for preparing numerical control information according to claim 7, wherein said data input device includes:

a first key for sequentially displaying on said display screen a plurality of shapes representing coordinate systems; and a second key for selecting a desired coordinate system, the display of a graphic representing a coordinate system being changed by said first key and a coordinate system being selected by said second key.

9. A system for preparing numerical control information comprising:

a graphic display device capable of displaying characters, symbols and graphics;

a data input device, operatively connected to said graphic display device, including shape symbol keys and capable of inputting at least numerical values and graphic symbols; and a device, operatively connected to said graphic display device and to said data input device, for executing the preparation of numerical control information, said device for executing the preparation of numerical control information recognizing the shape of a part on the basis of shape information input by said shape symbol keys, and capable of inputting graphic symbols, provided in said data input device.

10. A system for preparing numerical control information according to claim 9, wherein said shape symbol keys indicative of line segments for constituting the contour of a part are provided with directionality, the shape of a part being recognized successively on the basis of the shape symbols and directional information possessed by the pressed keys.

11. A system for preparing numerical control information comprising:
- a graphic display device capable of displaying characters, symbols and graphics;
- a data input device, operatively connected to said graphic display device, including shape symbol keys and capable of inputting at least numerical values and graphic symbols;
- a device, operatively connected to said graphic display device and to said data input device, for executing the preparation of numerical control information; and
- a shape registration system, operatively connected to said preparation device and said data input device, including a memory device operatively connected to said preparation device and said data input device, including shape codes and registration code numbers, said device for executing the preparation of numerical control information recognizes the shape of a part on the basis of shape information input by said shape symbol keys provided on said data input device, the shape of the part being stored in said memory device, as information indicative of retrievable shape, by creating said shape codes in the form of continuous shape symbols constituting the contour of the part, and by attaching said registration code numbers to the shape of said part.

12. A system for preparing numerical control information according to claim 11, wherein a new registration code is designated with respect to a one of said shape codes input by the input device or with respect to a one of said shape codes read from said memory device, the one of said shape codes being registered in new designated addresses of said memory device.

13. A system for preparing numerical control information comprising:
- a graphic display device capable of displaying characters, symbols and graphics;
- a data input device, operatively connected to said graphic display device and including a numerical value input keyboard, capable of inputting at least numerical values and graphic symbols; and
- a device, operatively connected to said graphic display device and said data input device, for executing the preparation of numerical control information, registration codes corresponding to a plurality of previously defined shape codes being added together by means of said numerical value input keyboard on the data input device, thereby to form information relating to a new shape obtained by combining the shapes designated by the shape codes.

14. A system for preparing numerical control information according to claims 9, 10, 11, 12 or 13, wherein said numerical value keys are made to correspond to shape symbols for entering the shape of a part, the numerical value keys being used to input information indicative of the shape of the part.

15. A system for preparing numerical control information comprising:
- a graphic display device including a display screen capable of displaying characters, symbols and graphics;
- a data input device, operatively connected to said graphic display device and said display screen therein, including numerical value input means capable of inputting at least numerical values and graphic symbol; and
- a device, operatively connected to said graphic display device and said display screen therein and to said data input device and said numerical value input means therein, for executing the preparation of numerical control information, selectable predetermined starting stock shapes and numerical values corresponding thereto are displayed on said display screen of said graphic display device, a starting stock shape corresponding to numerical information input by said numerical value input means on said data input device being used in the preparation of numerical control information.

16. A system for preparing numerical control information comprising:
- a graphic display device capable of displaying characters, symbols and graphic:
- a data input device, operatively connected to said graphic display device and including shape symbol keys, capable of inputting at least numerical values and graphic symbols: and
- a device, operatively connected to said graphic display device and said data input device, for executing the preparation of numerical control information, wherein the shape of a special starting stock is input in said device by using said shape symbols keys on said data input device.

17. A system for preparing numerical control information comprising:
- a graphic display device including a display screen capable of displaying characters, symbols and graphics;
- a data input device, operatively connected to said graphic display device and said display screen therein, including numerical input display means capable of inputting at least numerical values and graphic symbols; and
- a device, operatively connected to said graphic display device and said display screen therein and to said data input device and said numerical input display means therein, for executing the preparation of numerical control information, portions requiring an input of starting stock shape and dimension information are displayed on said display screen of said graphic display device, numerical values relating to said portions being used in the preparation of numerical control information, said numerical values being input sequentially by said numerical input display means of said data input display device.

18. A system for preparing numerical control information comprising:
- a graphic display device including a display screen capable of displaying characters, symbols and graphics;

a data input device, operatively connected to said graphic display device and said display screen therein, having numerical value keys capable of inputting at least numerical values and graphic symbols; and a device, operatively connected to said graphic display device and said display screen therein and said data input device, for executing the preparation of numerical control information, a portion of a part contour, which part contour corresponds to a shape symbol that applies directionality to a shape constituting the portion of the part contour, is drawn out on said display screen of said graphic display device, and dimensions are specified by establishing correspondence between the length of said portion of the part contour and a numerical value input by said numerical value keys of said data input device, numerical control information being prepared by repeating this operation to successively input portions of the part contour.

19. A system for preparing numerical control information according to claim 18, wherein a part contour of specified dimensions is displayed within the contour of a starting stock drawn out on said display screen.

20. A system for preparing numerical control information according to claim 18 or 19, wherein said preparation device includes a storage device operatively connected to said graphic display device and said display screen therein, wherein a part shape symbol stored in said storage device is read from said storage device and displayed on said display screen of said graphic display device, the part shape symbol vanishing from said display screen whenever there is an input of information relating to a segment of the part contour corresponding to said part shape symbol.

21. A system for preparing numerical control information comprising:
    a graphic display device including a display screen capable of displaying characters, symbols, and graphics;
    a data input device, operatively connected to said graphic display device and said display screen therein, capable of inputting at least numerical values and graphic symbols; and
    a device, operatively connected to said graphic display device and said display screen therein and to said data input device, for executing the preparation of numerical control information, a contour of a part is drawn out within a contour of a starting stock displayed on said display screen of said graphic display device, and there is an input of information that partitions, by means of line segments, the region between the part contour and starting stock contour along the boundary of machining areas, which information is input in said device for executing the preparation of numerical control information and is employed in the preparation of numerical control information.

22. A system for preparing numerical control information according to claim 21, wherein position indicating symbols are assigned to specified points on the contours of the starting stock and part, and in which the specified points are interconnected thereby to describe machining areas, specified point information and line segment information describing the machining areas being employed in the preparation of numerical control information.

23. A system for preparing numerical control information comprising:
    a graphic display device including a display screen capable of displaying characters, symbols and graphics;
    a data input device, operatively connected to said graphic device and said display screen therein, capable of inputting at least numerical values and graphic symbols; and
    a device, operatively connected to said graphic display device and said display screen therein and to said data input device, for executing the preparation of numerical control information, a list is displayed on said display screen of said graphic display device, said list comprising the names of tools used in machining a part, and numbers corresponding to said tools, and numbers of tools selected from said list are input by said data input device and employed in the preparation of numerical control information.

24. A system for preparing numerical control information comprising:
    a graphic display device including a display screen capable of displaying characters, symbols and graphics;
    a data input device, operatively connected to said graphic display device and said display screen therein, capable of inputting at least numerical values and graphic symbols; and
    a device, operatively connected to said graphic display device and said display screen therein and to said data input device, for executing the preparation of numerical control information, an item for characterizing the type of a selected tool is displayed on said display screen of said graphic display device, and a specific element of a tool selected for each item is input by using said data input device and is employed in the preparation of numerical control information.

25. A system for preparing numerical control information according to claim 24, wherein portions corresponding to the items for characterizing the shape and type of a tool are displayed along with the shape of the tool on the display screen.

26. A system for preparing numerical control information comprising:
    a graphic display device including a display screen capable of displaying characters, symbols and graphics;
    a data input device, operatively connected to said graphic display device and said display screen therein, capable of inputting at least numerical values and graphic symbols; and
    a device, operatively connected to said graphic display device and said display screen therein and to said data input device, for executing the preparation of numerical control information, wherein a list is displayed on said display screen of said graphic display device, said list comprising machining content and numbers correspondent thereto, and numbers specifying machining content that are selected from said list are input by said data input device and employed in the preparation of numerical control information.

27. A system for preparing numerical control information comprising:

a graphic display device including a display screen capable of displaying characters, symbols and graphics;

a data input device, operatively connected to said graphic display device and said display screen therein, capable of inputting at least numerical values and graphic symbols; and a device, operatively connected to said graphic display device and said display screen therein and to said data input device, for executing the preparation of numerical control information, graphics indicating machining area and items of data necessary for computing a machining schedule are displayed on said screen of said graphic display device, said data being input sequentially using said data input device and employed in the preparation of numerical control information.

28. A system for preparing numerical control information according to claim 27, wherein a tool path is drawn out in a machining area upon completing entry of the necessary data and processing for tool path computation.

29. A method for preparing numerical control information for machining a part, employing a processor, a memory and an input device including a display, comprising the steps of:
(a) inputting a selected coordinate system;
(b) inputting figure shape graphic symbols representing the shape of the part;
(c) inputting shape and dimensions of starting stock material;
(d) inputting the part dimensions;
(e) inputting designated rough machining areas;
(f) inputting a designated machining starting point;
(g) inputting selected tools for machining;
(h) inputting designated tool information for machining the part;
(i) designating a machining schedule for machining the part;
(j) preparing the machining schedule for machining the part from the selected coordinate system, the figure shape graphic sumbols, the shape and dimensions of the starting stock material, the part dimensions, the designated rough machining areas, the designated machining starting point, the selected tool and tool information, and the designated machining schedule; and
(k) machining in accordance with the prepared machining schedule.

30. A method for preparing numerical control information according to claim 29, wherein step a comprises the steps of:
(i) displaying on the display angle projections for each coordinate system;
(ii) inputting a selected angle projection for one of the coordinate systems;
(iii) displaying on the display the coordinate system selected; and
(iv) storing in the memory the coordinate system selected.

31. A method for preparing numerical control information according to claim 30, wherein step b comprises the steps of:
(i) inputting a code number for the figure shape;
(ii) inputting graphic symbols representing the figure shape;
(iii) displaying on the display the code number and graphic symbols representing the figure shape; and (iv) storing in the memory the code number and graphic symbols.

32. A method for preparing numerical control information according to claim 31, wherein step c comprises the steps of:
(i) displaying on the display stock shapes;
(ii) inputting a selected stock shape;
(iii) inputting dimensions of the selected stock;
(iv) displaying on the display the stock shape selected and the selected stock dimensions input as a first two-diminsional graph; and
(v) storing in the memory the selected stock shape and the selected stock dimensions.

33. A method for preparing numerical control information according to claim 32, wherein step d comprises the steps of:
(i) displaying on the display the graphic symbols representing the figure shape;
(ii) inputting a dimension for each graphic symbol and designating a line end point for each dimension;
(iii) displaying on the display the figure shape and dimensions as a second two-dimensional graph including the line end points;
(iv) storing in the memory the part dimensions.

34. A method for preparing numerical control information according to claim 33, wherein step e comprises the steps of:
(i) displaying on the display the second two-dimensional graph of the figure shape and dimensions superimposed on the first two-dimensional graph of the stock shape and dimensions;
(ii) inputting a selected one of the line end points;
(iii) inputting a dividing line graphic symbol representing a direction for a dividing line, the dividing line dividing the starting stock shape and including the selected line end point;
(iv) displaying on the display the first and second two-dimensional graphs and the dividing line;
(v) storing in the memory the dividing line.

35. A method for preparing numerical control information according to claim 34, wherein step f comprises the steps of:
(i) displaying on the display the first two-dimensional graph representing the stock shape and dimensions superimposed on the selected coordinate system;
(ii) inputting starting coordinates for the machining starting point;
(iii) displaying on the display the machining starting point;
(iv) storing in the memory the machining starting point.

36. A method for preparing numerical control information according to claim 35, wherein step g comprises the steps of:
(i) displaying on the display tool types available for machining;
(ii) inputting one of the tool types;
(iii) displaying on the display the tool type selected; and
(iv) storing in the memory the tool type input.

37. A method for preparing numerical control information according to claim 36, wherein step h comprises the steps of:
(i) displaying on the display categories of information necessary for designating tool information;
(ii) inputting tool information for each category;

(iii) displaying on the display the inputted too information; and (iv) storing in the memory the inputted tool information.

38. A method for preparing numerical control information according to claim 37, wherein step i comprises the steps of:

(i) displaying on the display available machining operations;

(ii) inputting a sequence of machining operations necessary for machining the part;

(iii) displaying on the display the sequence of machining operations input;

(iv) storing in the memory the sequence of machining operations input;

(v) displaying on the display each of the machining operations in the sequence;

(vi) inputting other machining information for each of the machining operations in the sequence;

(vii) displaying on the display the other machining information; and (viii) storing in the memory the other machining information.

* * * * *

UNITED STATES PATENT AND TRADEMARK OFFICE
CERTIFICATE OF CORRECTION

PATENT NO. : 4,490,781

DATED : December 25, 1984

INVENTOR(S) : Hajimu Kishi et al.

It is certified that error appears in the above-identified patent and that said Letters Patent is hereby corrected as shown below:

Col. 1, line 13, after "view" insert --of--.

Col. 10, line 63, "a" (first occurrence) should be --$a$--;
line 68, "a" should be --$a$--.

Col. 11, line 4, "a" should be --$a$--;
line 12, "b" should be --$b$--;
line 16, "b" should be --$b$--;
line 21, "b" should be --$b$--'
line 29, "c" should be --$c$--;
line 30, "b" should be --$b$--;
line 32, "c" should be --$c$--.

Col. 13, line 1, "located" should be --locate--.

Col. 15, line 14, "r" should be --$r$--;
line 17, "r" should be --$r$--.

Col. 17, line 5, "table" should be --tablet--.

UNITED STATES PATENT AND TRADEMARK OFFICE
CERTIFICATE OF CORRECTION

PATENT NO. : 4,490,781

DATED : December 25, 1984

INVENTOR(S) : Hajimu Kishi et al.

It is certified that error appears in the above-identified patent and that said Letters Patent is hereby corrected as shown below:

Col. 20, line 30, "graphic" should be --graphics--.

Col. 21, line 63, "in which" should be --wherein--.

Col. 25, line 1, "too" should be --tool--.

Signed and Sealed this

Thirtieth Day of July 1985

[SEAL]

Attest:

DONALD J. QUIGG

Attesting Officer

Acting Commissioner of Patents and Trademarks